United States Patent [19]
Brooks, Jr. et al.

[11] Patent Number: 6,067,530
[45] Date of Patent: *May 23, 2000

[54] CASH MANAGEMENT SYSTEM

[75] Inventors: William F. Brooks, Jr., Montchanin, Del.; James K. Bluebello, Springfield, Pa.; Louis J. Frontino, Cherry Hill, N.J.

[73] Assignee: Brooks Armored Car Services, Inc., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/542,984

[22] Filed: Oct. 13, 1995

[51] Int. Cl.[7] ............................................. G06F 17/60
[52] U.S. Cl. .......................... 705/30; 194/206; 194/217; 377/14; 700/90; 705/18; 705/24; 902/11
[58] Field of Search .................... 194/206, 217; 209/534; 235/100; 364/400; 377/8, 13, 14; 395/201, 218, 224, 230; 902/7, 11, 17; 705/1, 18, 24, 30; 700/90

[56] References Cited

U.S. PATENT DOCUMENTS

| | | | |
|---|---|---|---|
| 3,826,344 | 7/1974 | Wahlberg | 194/206 |
| 4,023,011 | 5/1977 | Nakajima et al. | 902/7 X |
| 4,070,564 | 1/1978 | Tucker | 364/705 |
| 4,209,782 | 6/1980 | Donath et al. | 340/147 MD |
| 4,310,885 | 1/1982 | Azcua et al. | 364/405 |
| 4,312,277 | 1/1982 | Graef et al. | 103/24.1 |
| 4,436,182 | 3/1984 | Simonotti et al. | 186/37 |
| 4,554,444 | 11/1985 | Hirose | 235/379 |
| 4,638,746 | 1/1987 | Ishigure | 109/52 |
| 4,808,801 | 2/1989 | Nakagawa | 235/379 |
| 4,812,994 | 3/1989 | Taylor et al. | 364/464.2 |
| 4,851,652 | 7/1989 | Imran | 235/382 |
| 4,877,235 | 10/1989 | Robinson et al. | 271/279 |
| 4,913,341 | 4/1990 | Bachman | 232/1 D |
| 4,916,443 | 4/1990 | Barrett et al. | 340/825.31 |
| 4,922,837 | 5/1990 | McGunn | 109/46 |
| 4,929,880 | 5/1990 | Henderson et al. | 320/30 |
| 4,977,502 | 12/1990 | Baker et al. | 364/405 |
| 4,977,583 | 12/1990 | Gorgone | 377/8 |
| 4,980,569 | 12/1990 | Crane et al. | 250/556 |

(List continued on next page.)

FOREIGN PATENT DOCUMENTS

| | | |
|---|---|---|
| 161431 | 10/1954 | Australia . |
| 62-6391 | 1/1987 | Japan . |
| 2217073 | 10/1989 | United Kingdom . |

OTHER PUBLICATIONS

"Cash Management: The Needs are the Same Only the Methods Change"; Form Ab101–5M 991, Allied Grey International, PO Box 947 Waynesboro, GA., 1990.

Armor Safe Technologies Your Custom Requirements . . . Design Our Standard Product; CacheSystem, Inc. 2580 Progress Street, Vista, California, 1993.

"Why the McGunn Smart Safe 2000?"; McGunn Safe Company 4917 S. Central Avenue Chicago II, 1994.

"Computerized to Provide Perfect Security and Save Thousands in Operation Costs!", McGunn Safe Company 4917 S. Central Avenue Chicago II, Oct. 1994.

"Cash Control Safes Built for Use in the Convenience Store, Petroleum and Restaurant Industries"; McGunn Security Portfolio, McGunn Safe Company 4917 S. Central Avenue Chicago II, Oct. 1994.

Tidal Engineering, Inc., "Still Taking Chances With Your Cash Management", TACC Cash Deposit and Dispensng Safe, 1993, 4 pages.

Centurion Deposit corporation, TSBD 2018 Multi "Shutter Slot" Depository, 1986, 2 pages.

Tidel Engineering, Inc., "This Doesn't Seem Like Much Now", TACC Cash Dispenser 1993, 4 pages.

*Primary Examiner*—Edward Cosimano
*Attorney, Agent, or Firm*—Christie, Parker & Hale, LLP

[57] ABSTRACT

A cash management system that tracks bills received at at least one business establishment by cashier, by amount and by time while securing those bills immediately within a drop safe upon receipt from the customer in preparation for pickup by a courier service.

84 Claims, 12 Drawing Sheets

U.S. PATENT DOCUMENTS

| | | | |
|---|---|---|---|
| 4,988,987 | 1/1991 | Barrett et al. | 340/825.31 |
| 5,012,896 | 5/1991 | Ono et al. | 235/381 |
| 5,035,187 | 7/1991 | McGunn | 109/46 |
| 5,076,413 | 12/1991 | Davila et al. | 194/206 |
| 5,090,222 | 2/1992 | Imran | 70/63 |
| 5,113,900 | 5/1992 | Gabrius et al. | 194/206 |
| 5,161,736 | 11/1992 | Roccoberton et al. | 232/15 |
| 5,164,718 | 11/1992 | Cedegren | 340/825 |
| 5,173,590 | 12/1992 | Nakano et al. | 235/379 |
| 5,209,335 | 5/1993 | Shuren et al. | 194/200 |
| 5,209,395 | 5/1993 | Zpouzoulas et al. | 232/15 |
| 5,252,811 | 10/1993 | Henochowicz et al. | 235/379 |
| 5,366,404 | 11/1994 | Jones | 453/2 |
| 5,538,122 | 7/1996 | Siemens | 194/207 |
| 5,695,038 | 12/1997 | Keith, III et al. | 194/206 |
| 5,725,081 | 3/1998 | Meeker | 194/206 |
| 5,742,034 | 4/1998 | Meeker | 235/375 |
| 5,813,510 | 9/1998 | Rademacher | 194/206 |
| 5,883,371 | 3/1999 | Meeker | 235/379 |
| 5,944,163 | 8/1999 | Keth, III et al. | 194/206 |
| 5,975,275 | 11/1999 | Keith, III et al. | 194/217 |

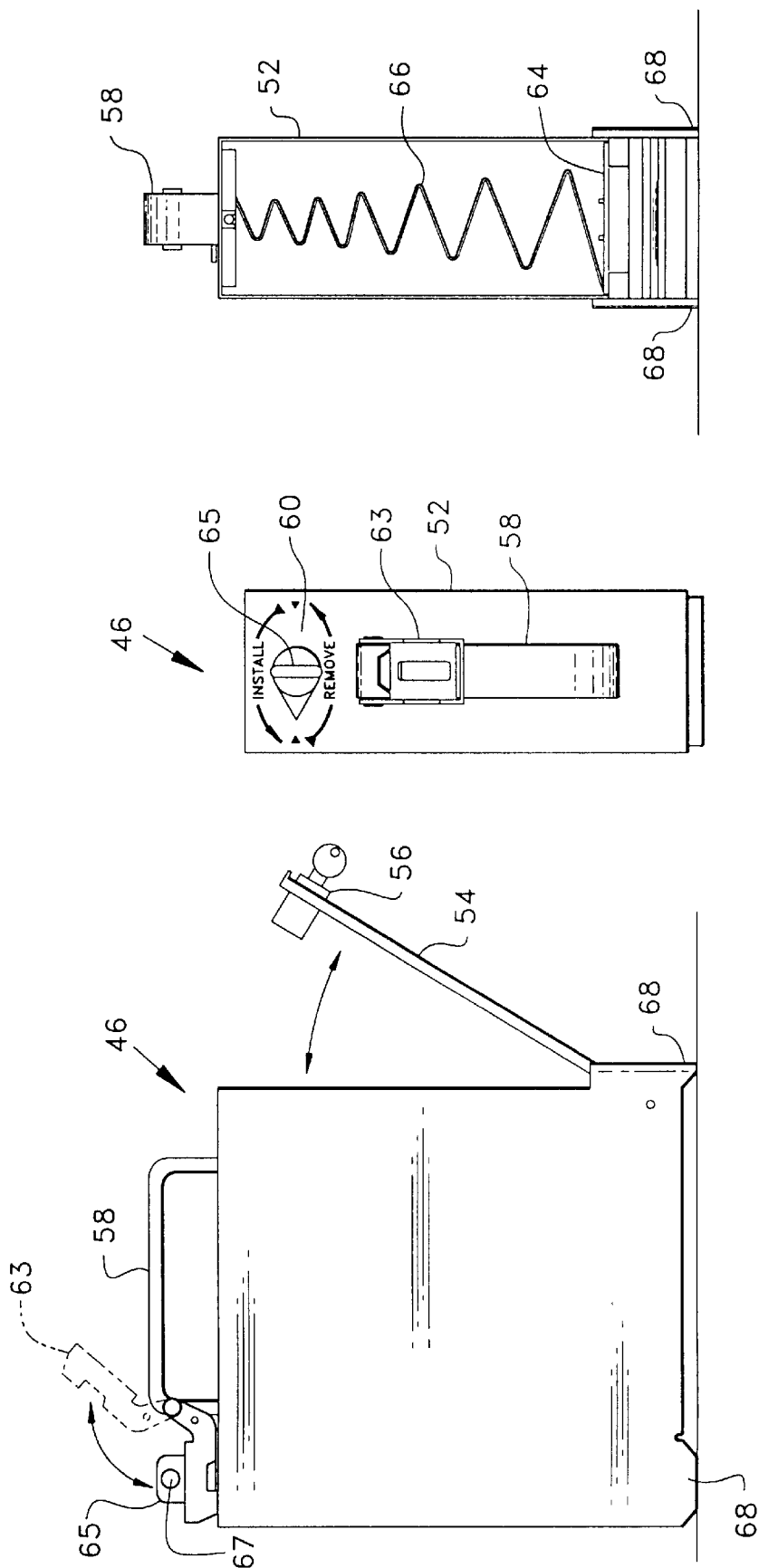

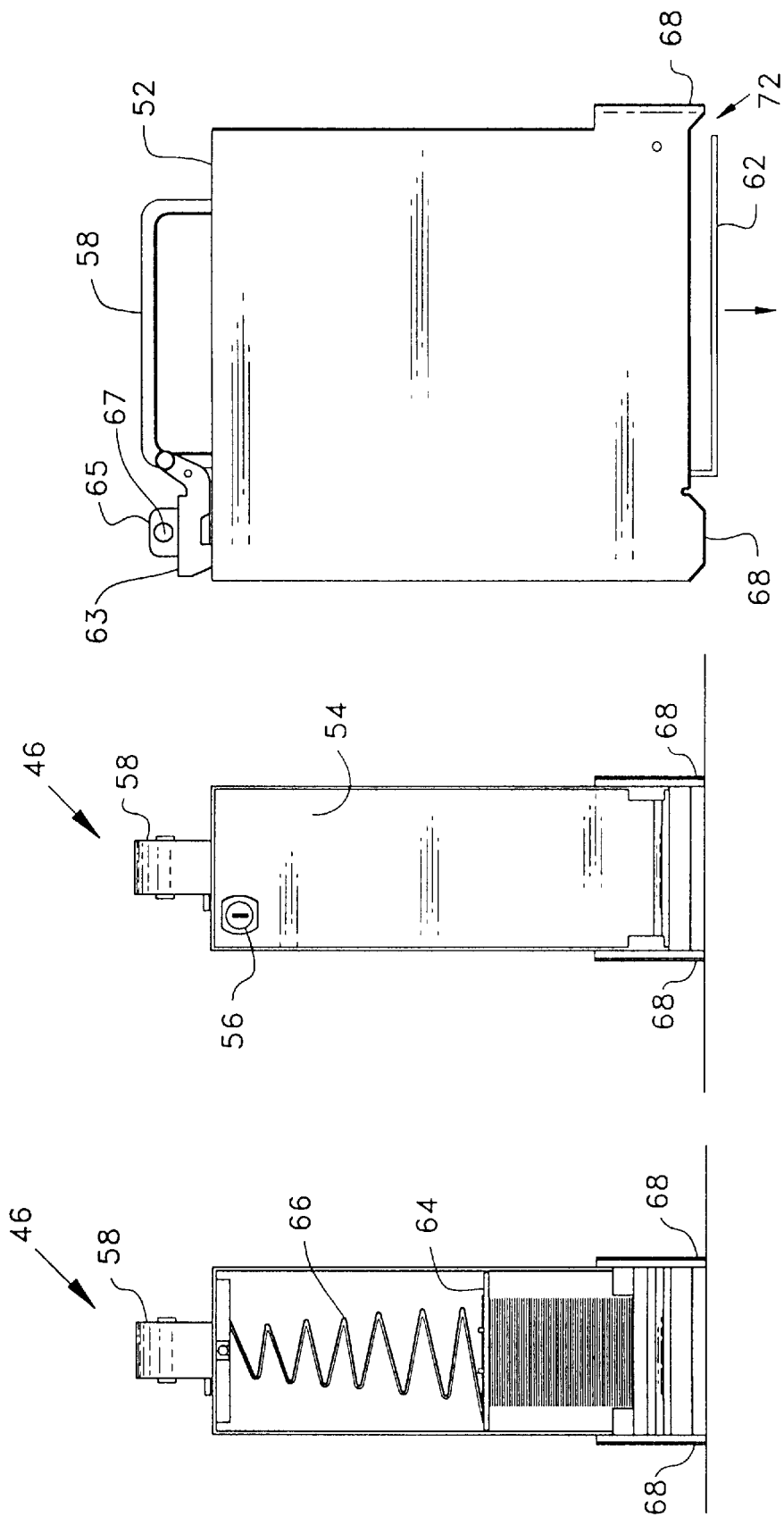

CASH MANAGEMENT SYSTEM

FIELD OF THE INVENTION

The invention relates generally to cash management systems. More particularly, the invention pertains to a cash management system for use in stores for securing and accounting for received bills by cashier.

BACKGROUND OF INVENTION

Cash management in stores today can be described as simply allowing money collected from customers to accumulate in the register. When there is an excess accumulation of cash (i.e., an amount of cash exceeding a predetermined amount of cash) in the register, the cashier drops the excess bills into a "drop safe". At a later predetermined time (or times) the store manager recovers those dropped bills. In particular, the actual management of cash in most stores comprises the manager of each store opening the safe once a day, taking the cash into the back room, counting the cash and filling out deposit slips. The manager then takes the cash to the bank for deposit with the deposit slips. This procedure is not only burdensome with regard to the time required by the manager, but there is also the potential of a robbery when the money is exposed in the back room with the manager as well as during the transport from the store to the bank.

This cash management process in a retail store requires a "counting" to be done during each of four stages: (1) when the cashier makes change for the customer during the transaction; (2) when the cashier removes the excess cash from the cash register; (3) when the store manager retrieves the cash from each of the drop safes and then counts/verifies that the total of each cashier's drops equals the total sales rung up by that cashier; and (4) when the store manager assembles all of the cash drops into a single collection for preparation of a bank deposit, the manager must add up all of the cash and verify that the store's total amount of sales is equivalent to the total amount of cash that is in place. The counting of stages 3 (i.e., balancing by cashier) and 4 (balancing the entire store) can be summarized by the following audit equation, namely, $$Amount_{SAFE} + Amount_{REGISTER} = Amount_{RUNG\ UP} + Amount_{STARTING}.$$

In addition, in the present convenience stores owned by the Assignee of the present invention, namely Wawa, Inc., the cash management strategy is to not only track total revenues versus total cash on hand, but to track by individual cashier, the amount of sales that were rung up versus the amount of cash that that individual placed into the safe.

However, such a four stage process involves redundant counting of money and is very complicated. It is, therefore, desirable to make only a single "count" at stage 1 and thereby eliminate duplicative counting at stages 2–4.

The cash management system of the present invention facilitates this audit by providing the store manager, as well as the store owner, with the amount of cash dropped in the safe, thereby eliminating the counting of stages 2–4.

The following U.S. Patents disclose examples of cash management or securement devices.

In U.S. Pat. No. 5,035,187 (McGunn) and U.S. Pat. No. 4,922,837 (McGunn) there is disclosed a safe having multiple openings in the form of drawers, with each of the drawers having different colors. The colors permit the separation of money dropped in the safe by person or by shift.

In U.S. Pat. No. 5,252,811 (Henochowicz et al.) there is disclosed a system for using automatic cash savings machines, where individual savers may deposit cash. The cash savings machines have means for insertion of the ID of the saver. The cash boxes are periodically picked up by an armored courier with the information as to the amount deposited and the ID of the depositor, either recorded and carried on a data disk or communicated by a satellite or land links to a central location.

In U.S. Pat. No. 5,164,718 (Cedergren) there is disclosed a locking system for locking and unlocking a container wherein the locking system is controlled via an electronically-controlled code lock interacting with a control device.

In U.S. Pat. No. 4,851,652 (Imran) there is disclosed an electronic lock box that operates in conjunction with a computer with individual electronic keys.

In U.S. Pat. No. 5,090,222 (Imran) there is disclosed a lock box that utilizes an electronically-driven actuator for latching and unlatching the locking member.

In U.S. Pat. No. 4,916,443 (Barrett et al.) there is disclosed an electronic lock system that utilizes a key having a memory which collects data relating to lock operation each time the key interacts with the lock system.

In U.S. Pat. No. 4,988,987 (Barrett et al.) there is disclosed an electronic lock system with individual access using key pads with electronic keys having predetermined useful lives.

In U.S. Pat. No. 4,209,782 (Donath et al.) discloses an electronically-controlled release of a safe with function locks using electronically coded keys. The various users can be automatically identified or registered with the aid of an employed code association.

In U.S. Pat. No. 4,929,880 (Henderson et al.) there is disclosed an electronic lock system with battery conservation features.

In U.S. Pat. No. 4,312,277 (Graef et al.) there is disclosed a remote depository with sealed container construction that is used for receiving bank transaction deposits in envelopes at an unmanned location under conditions of security.

In U.S. Pat. No. 5,209,395 (Zouzoulas et al.) there is disclosed a method and apparatus for a lockable, removable cassette, for securely storing currency.

In U.S. Pat. No. 5,209,335 (Shuren et al.) there is disclosed a security arrangement for use with a lockable, removable cassette.

In U.S. Pat. No. 4,913,341 (Bachman) there is disclosed a currency storage device for stacking and storing paper currency.

In U.S. Pat. No. 4,638,746 (Ishigure) there is disclosed a device for automatically opening and closing the cash inlet-outlet opening of a cash container which is detachably installable into a rack in a cash handling apparatus.

In U.S. Pat. No. 5,161,736 (Roccoberton et al.) there is disclosed a locking currency stacker for use with a currency validation apparatus.

In U.S. Pat. No. 4,980,569 (Crane et al.) there is disclosed a security paper verification device for detecting the presence or absence of the security feature that are embedded in the paper.

The following are examples of safes that are commercially available for use in cash management systems.

Allied/Gary International manufactures a number of safes for commercial use, including the AUTOBANK 24, AUTOBANK 24I and AUTOBANK 24 IS for use in store cash management systems.

McGunn Safe Company manufactures a number of safes for commercial use, including the QUICK DROP 1512, the CASH HANDLER 2820E and the SMART SAFE®. The SMART SAFE® includes color-coded drawers, envelopes and canisters and includes automated tracking via a screen and/or reports from a printer.

Armor Safe Technologies manufactures a line of cash controller products under the name CACHESYSTEM™, such as CHANGEBANK™, the TREASURY™, REDICACHE™, POSICACHE™ and VALIDROP. However, these products when used for electronic drop safes as intended for the environment of this invention, are not functionally nor ergonomically suited for a store operation at a cashier station.

OBJECTS OF THE INVENTION

Accordingly, it is a general object of this invention to provide a cash management apparatus which overcomes the disadvantages of the prior art.

It is an object of this invention to provide apparatus that provides cash management that does not cause disruption to customer service.

It is another object of this invention to provide apparatus that enables the store manager to spend less time counting money and more time servicing customers.

It is yet another object of this invention to provide cash management apparatus that tracks cash drops based on bill denominations and cashiers during any shift.

It is still another object of this invention to provide cash management apparatus that minimizes data entry by the cashier.

It is a further object of this invention to provide cash management apparatus for a system that is modular in design.

It is a further object of this invention to provide cash management apparatus that minimizes the need for the cashier to turn away from his/her register.

It is still yet a further object of this invention to minimize the amount of time that cash received is outside of a safe.

It is even yet a further object of this invention to eliminate the need for the store manager to sort the cash received at the end of a shift.

It is still yet a further object of this invention to provide cash management apparatus that eliminates the need for the store manager having to manually verify each cashier.

SUMMARY OF THE INVENTION

These and other objects of the instant invention are achieved by providing a cash management system for at least one business establishment for tracking bills received from customers during sales transactions and for immediately securing the bills in preparation for pickup by a courier service for delivery to a processing center. Each establishment has a plurality of cashiers with respective individual I.D.'s, at least one store manager and at least one cash register. The cashiers receive bills from customers during sales transactions. The system comprises at each establishment at least one drop safe having a slot into which the cashier enters each bill received from a customer into the at least one drop safe, thereby defining a drop. The at least one drop safe comprises a bill validator for determining the denomination of each of the bills in each of the drops. The system further comprises a controller coupled to the bill validator for tracking each of the drops, including the amount in each of the drops and the time at which each of the drops is made into the drop safe. In addition, the controller associates a respective individual I.D. with each of the drops according to the cashier having the respective individual I.D. who made the drop. The controller is adjacent the cash register.

In a another embodiment of the cash management system, the at least one business establishment further includes at least one electronic cash register coupled to a store host computer having a store system printer. This cash management system also comprises at each establishment at least one drop safe having a slot into which the cashier enters each bill received from a customer into the at least one drop safe, thereby defining a drop. The at least one drop safe comprises a bill validator for determining the denomination of each of the bills in each of the drops. This system also further comprises a controller coupled to the bill validator for tracking each of the drops, including the amount in each of the drops and the time at which each of the drops is made into the drop safe. The controller associates a respective individual I.D. with each of the drops according to the cashier having the respective individual I.D. who made the drop. The controller of this cash management system is coupled to the store host computer and wherein the store host computer and the controller each comprise real time clocks that, are synchronized with each other. The controller transmits to the store host computer data relating to each of the drops, including the amount in each of the drops, and the time at which each of the drops is made into said drop safe. In addition, the controller associates a respective individual I.D. with each of the drops according to the cashier having the respective individual I.D. who made the drop.

DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 4A is a side view of the removable, lockable canister;

FIG. 4B is a top view of the removable, lockable canister;

FIG. 4C is front view of the removable, lockable canister with its door open and depicting the canister in an empty condition;

FIG. 4D is the same view of FIG. 4C with the removable, lockable canister being partially filled with bills;

FIG. 4E is a front view of the removable, lockable canister with its door locked;

FIG. 4F is a side view of the removable, lockable canister showing the lock plate open for receipt of bills from the bill validator;

DETAILED DESCRIPTION OF THE PREFERRED EMBODIMENT

Figure 1A:
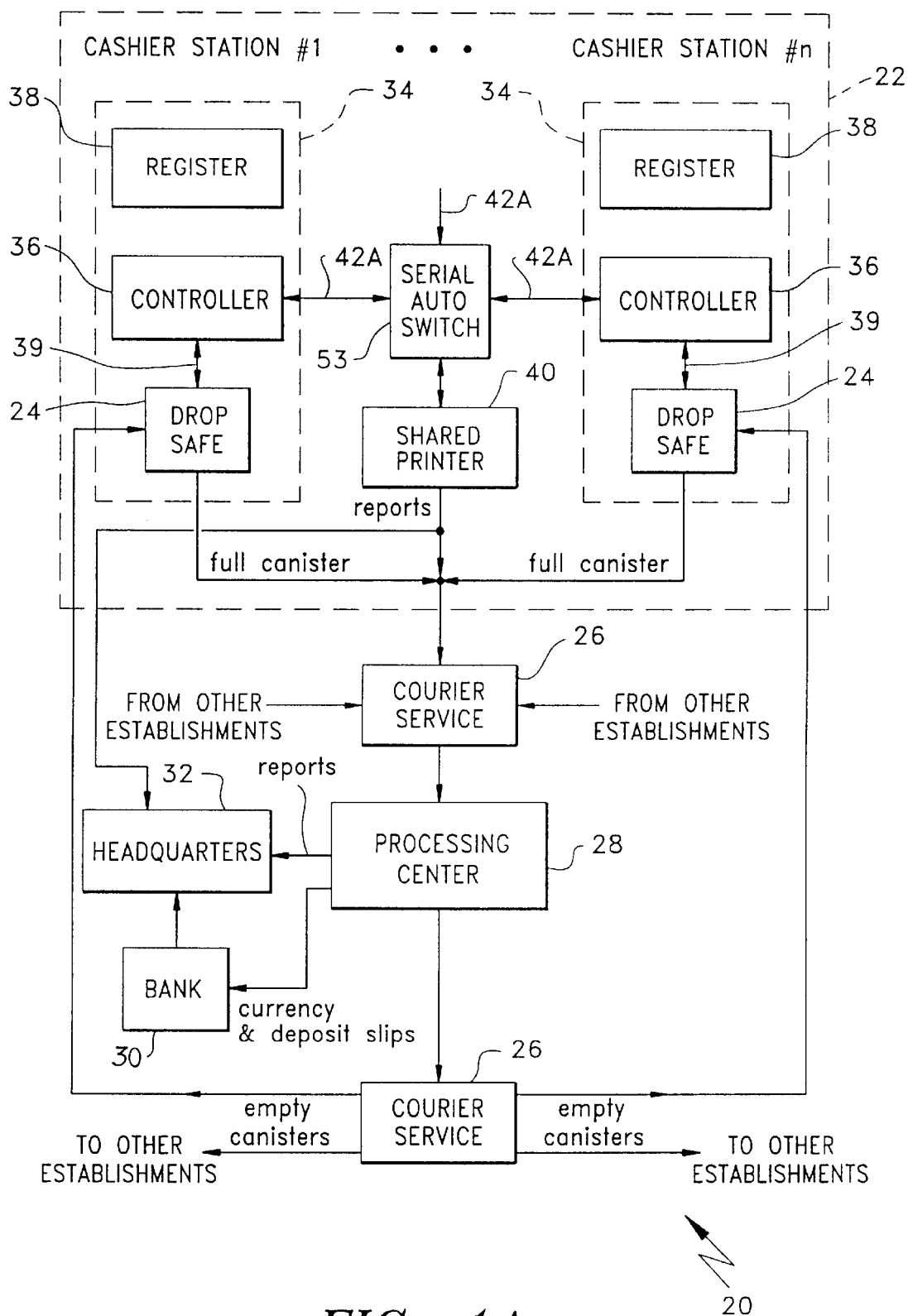
FIG. 1A is a block diagram of a first embodiment of the present invention.

Referring now in detail to the various figures of the drawing wherein like reference characters refer to like parts, there is shown at 20 in FIG. 1A, a first embodiment of the Cash Management System (hereinafter "CMS"). The CMS 20 comprises at least one establishment subsystem 22 that tracks the bills received at that establishment (e.g., a convenience store) based on bill denominations and cashier that a particular cashier received while simultaneously securing those bills immediately upon receipt from the customer in an electronic drop safe 24 (to be discussed in detail later).

Each electronic drop safe 24 comprises a bill validator 44 (to be discussed later) and a bill canister 46. The bill canister 46 is removable in preparation for pick-up by a courier service 26 (an armored courier service, although not required, is preferable for security purposes). The courier service 26 delivers the canisters (along with a Canister Close-Out Report; see Report #4 in Appendix) to a processing center 28 where the bills are actually removed and physically sorted according to bill denominations by a bill separator, such as the CSI CPS600 Transport. The importance of the processing center 28 in the CMS 20, among other things, is that once the bill is "dropped" into the safe 24 by the cashier from a customer, that bill remains secured within the safe 24 until it reaches the security of the processing center 28. In other words, actual "bill counting" is eliminated at the establishment 22 which not only alleviates a time-consuming task of the store manager, but also minimizes any exposure that those bills have outside of the safe 24 at the establishment 22.

Upon completion of the processing by the processing center 28, the currency and deposit slips are delivered to a bank 30 from the processing center 28. The courier service 26 (usually the same service that delivered the notes to the processing center 28) then returns the empty canisters back to the respective establishments. In addition, the processing center 28 transmits a report (of what was processed) to the customer's headquarters 32. The bank 30 transmits its own report directly to the customer's headquarters 32 regarding what was actually deposited in the bank 30 from the processing center 28. Furthermore, as shown in FIG. 1A, the store manager reports directly to the headquarters 32 what was given to the courier service 26 for processing. Therefore, three points of correlation are established: (1) the report from the establishment 22 itself showing what was given to the courier service 26 for processing; (2) a report from the processing center 28 showing what was actually processed; and (3) a report from the bank showing what was actually credited to the customer's account.

It should be noted at this juncture that the term "drop" hereinafter refers to one bill or a plurality of bills that are successfully fed into the bill validator 44 before either the ENTER key on the controller keypad 80 (to be discussed later) is depressed by the cashier or before a time-out (also to be discussed later) occurs.

Figure 2A:
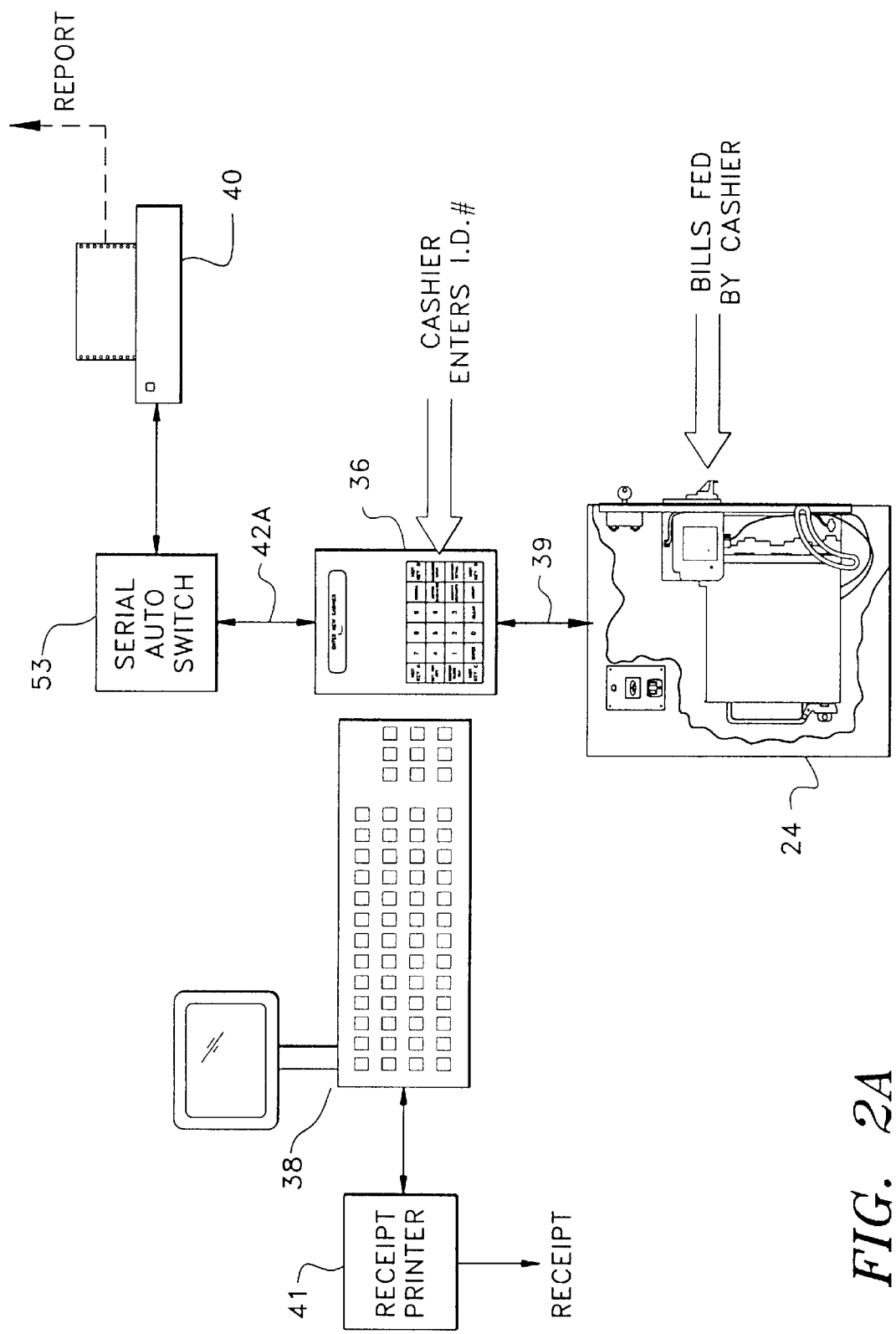
FIG. 2A is a block diagram of the cashier's station for the first embodiment.

Each establishment subsystem 22 comprises at least one cashier station 34 which in turn comprises an electronic drop safe 24, a controller 36 and a cash register 38. As shown in FIG. 1A, the controller 36 is electronically coupled to the electronic drop safe 24 (in particular, to the bill validator 44 in the drop safe 24) via a data interface line 39. The bill validator 44 passes the pertinent information (e.g., bill denomination) to the controller 36 via this interface line 39. The controller 36 is located adjacent the cash register 34, as shown in FIG. 2A, to permit the cashier to activate the controller 36 (as will be discussed later) without requiring the cashier to turn away from the cash register 38. During the tendering process, when the cashier keys into the register 38 the amount of money that the customer gives the cashier to pay for the purchase, the register 38 in turn calculates the change.

In addition, all cashier stations 34 that are located at a common counter (not shown) share a common printer 40 via respective printer interface lines 42A (e.g., serial port, RS-232). In particular, the printer interface lines 42A are coupled to a serial auto switch 53 (to be discussed later) that is coupled to the shared printer 40. Upon cash-out of a particular cashier, the printer 40 provides a report (see Appendix, Report #1: Cashier Close-Out) of the cash drops into the electronic safe 24 made by that cashier at that cashier's station 34 during his/her shift. Furthermore, as shown in FIG. 2A, the cash register 38 comprises a receipt printer 41 that provides receipts for transactions made at that register 38. The store manager then utilizes the information from the report provided by the shared printer 40 (i.e., regarding the cash drops in the electronic safe 24) and the information from the receipt provided by the receipt printer 41 (i.e., regarding the transactions made at the register 38) to manually reconcile the store's cash in accordance with the following equation:

$$\text{Amount}_{SAFE} + \text{Amount}_{REGISTER} = \text{Amount}_{RUNG\ UP} + \text{Amount}_{STARTING}.$$

It should be noted that the shared printer 40 can provide any of the reports (also referred to as "printouts") set forth in the Appendix, including reports that the courier service 26 transports along with the bill canisters, to be discussed later. The shared printer 40 (e.g., dot matrix printer) provides these hard copy reports on standard paper. In addition, the shared printer 40 is bar code capable (code 39).

Figure 1B:
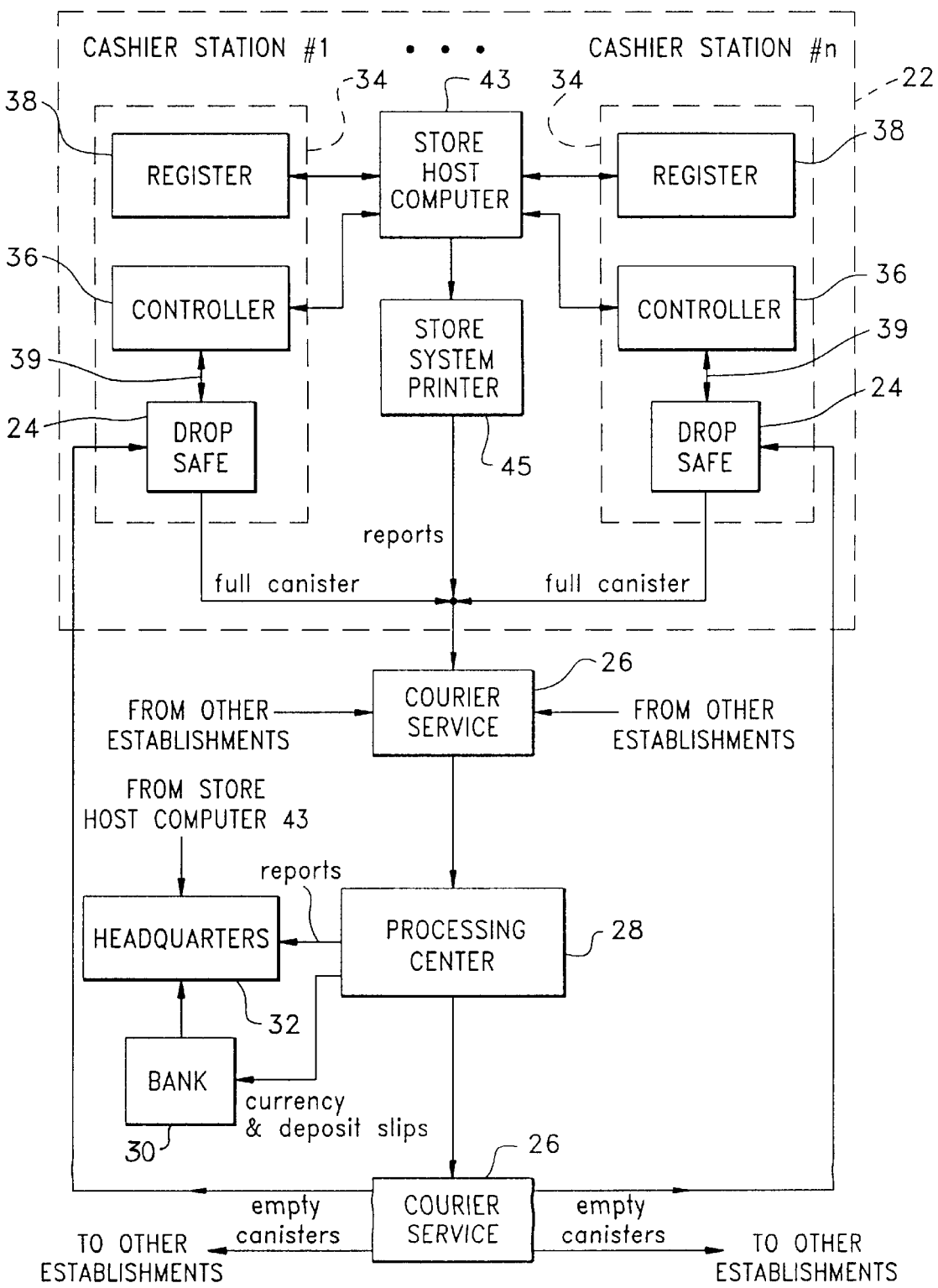
FIG. 1B is a block diagram of a second embodiment of the present invention.

Alternatively, there is shown in FIG. 1B a second embodiment 220 of the CMS. In this second embodiment 220, the cash register 38 at each cashier station 34 is an electronic cash register (e.g., a SASI electronic register Model MN1028 or SWEDA or any other electronic cash register) that is electronically coupled to a conventional store host computer 43. Typically, the store host computer 43 communicates with every electronic cash register in the establishment 22. The store host computer 43 further comprises a store system printer 45 that provides reports of the store's cash. In addition, the store host computer 43 communicates directly with the customer headquarters 32 for providing the store's cash status to the headquarters 32.

Figure 2B:
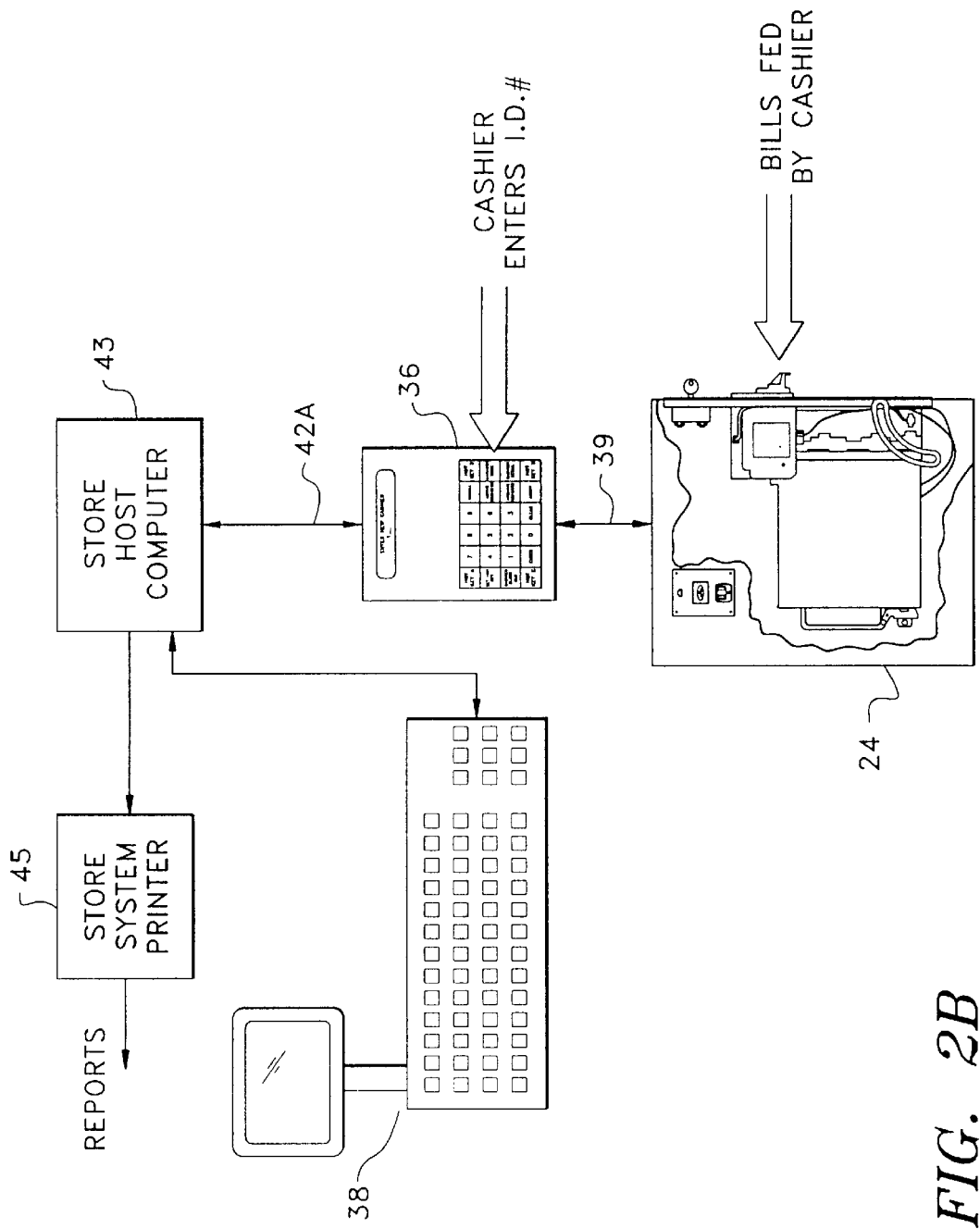
FIG. 2B is a block diagram of the cashier's station for the second embodiment.

As shown in FIG. 2B, in this second CMS embodiment 220, each controller 36 communicates electronically with the store host computer 43 over data interface lines 42B, rather than communicating with the shared printer 40, as in the first CMS embodiment 20. In this second CMS embodiment 220, the store host computer 43 is updated by the controller 36 each time a drop is made into the electronic safe 24 (FIG. 2B). Such a configuration establishes an electronic cash reconciliation for the store's cash and thereby eliminates the need for a manual cash reconciliation (conducted by the store manager) that is necessary with the first CMS embodiment 20. Any reports (printouts) to be generated from this second embodiment CMS 220 (such as those set forth in the Appendix, including reports that the courier service 26 transports along with the bill canisters 46) are provided by the store system printer 45.

It should be noted also at this juncture that the data interface 42B can be any suitable communications link (e.g., RS-232 serial link) that is well-known in the art or a data interface that can be designed by anyone skilled in the art without any undue experimentation; as such, the data interface 42B will not be further discussed.

It should also be noted that the reference to the electronic cash registers 38 (e.g., a SASI electronic register Model MN1028 or SWEDA) is by way of example only and not by way of limitation; other suitable electronic cash registers could be utilized.

Other than the above differences, the first embodiment 20 and the second embodiment 220 are similar.

It should be further noted, that depending on the style of cash management at any particular establishment, use of the first embodiment CMS 20 or the second embodiment CMS 220 are both within the broadest aspect of this invention. In particular, it is the modular design of the CMS 20 and CMS 220 that permits the customer to decide if the controller 36 should be coupled to a shared printer 40 or to a store host computer 43.

Figure 3A:
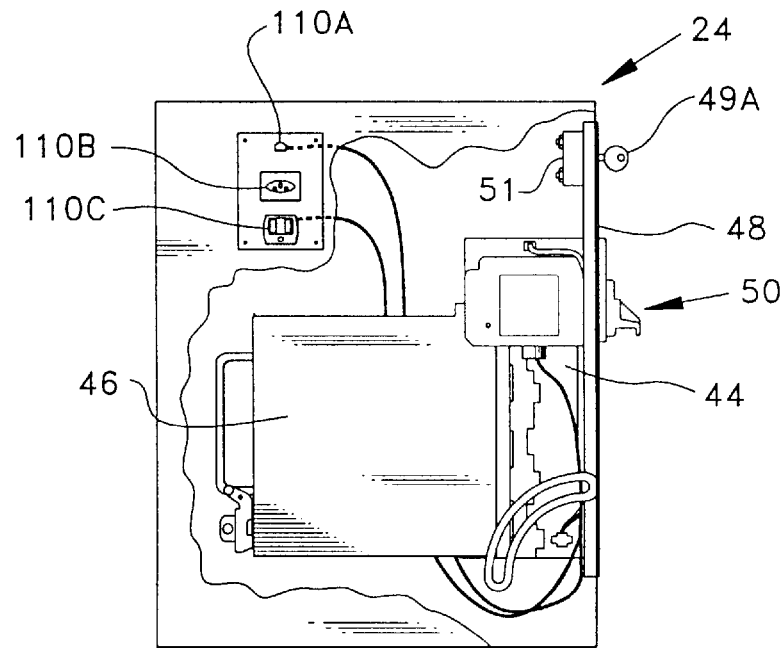
FIG. 3A is a view of the left side of the electronic drop safe with the safe door in a closed condition.
Figures 3B, 3C:
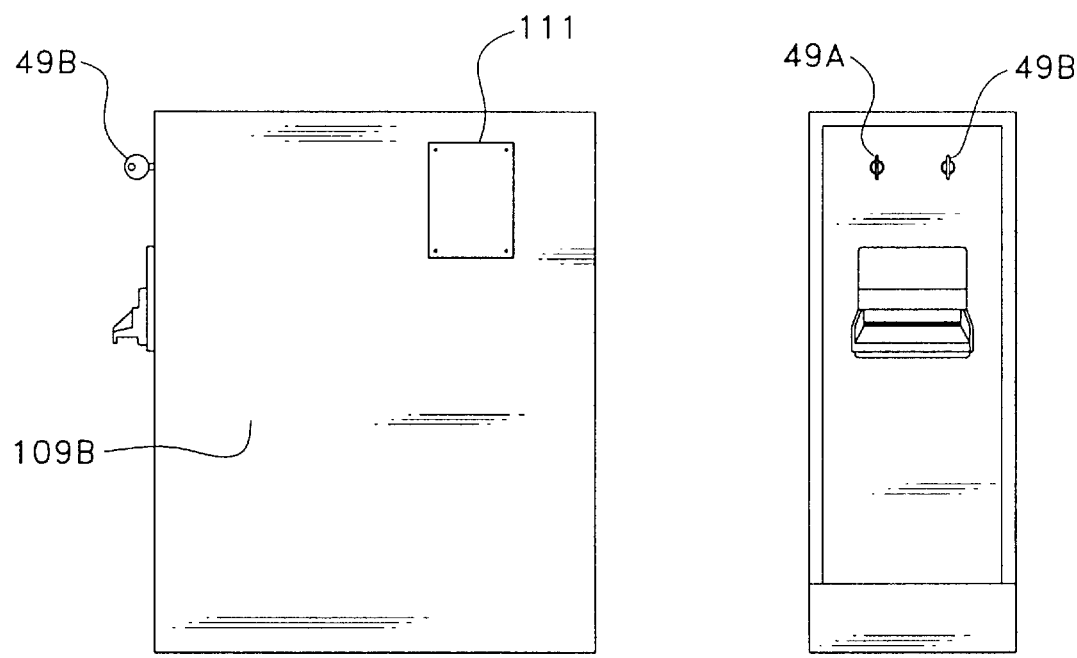
FIG. 3B is a view of the right side of the electronic drop safe of FIG. 3A.
FIG. 3C is a front view of the electronic drop safe of FIGS. 3A and 3B.

As shown in FIGS. 3A–3G, the electronic drop safe 24 comprises a bill validator 44 (e.g., Mars Electronics International SA-7-LRC-L1-D Bill Validator, or its equivalent) with a lockable, removable canister 46, as will be discussed in detail later. The bill validator 44 is fixedly mounted to the inside surface of the door 48 of the electronic safe 24. Bills are fed into the bill validator 44 via a bezel 50 which protrudes from the outside surface of the door 48 of the safe 24. Access to the bill validator 44 can only be accomplished when the door 48 is opened. As also shown in FIG. 3C, two keys 49A and 49B are required to open the electronic drop safe 24. (The depiction of the two keys 49A/49B inserted in the lock mechanism of the door 48 represents the door 48 at the time of the canister pick-up by the courier service 46; normally, neither one of the keys 49A/49B is left inserted in the lock mechanism 51 during any other time). Authorization for opening the safe door 48 can vary depending on the management wishes. For example, one key 49A may be retained by the store manager and the other key 49B may be retained by the courier service 26. In this configuration, opening the safe door 48 requires both a store manager and courier service 26 representative. Alternatively, the store manager may retain both keys 49A/49B or the courier service 26 may retain both keys such that only one of those entities can open the safe door 48.

Because space is limited under the cashier's counter, it is desirable to have the dimensions of the electronic drop safe 24 as small as possible, while, at the same time, permitting the bill validator 44 and the canister 46 to be encased within a secure metal enclosure. The electronic drop safe 24 is securely mounted underneath the cashier's counter.

It should also be noted at this juncture that the use of one electronic drop safe 24 per register 38 avoids the need to have a central electronic drop safe 24 located equidistant from the cashiers that may require each cashier to turn away from his/her respective register 38. This would defeat the purpose of minimizing the cashier's reach, gaze and sale processing that occurs at their respective registers 38. It is, therefore, within the broadest aspect of this invention to include a common electronic drop safe 24 only where the location of such a drop safe supports the minimization of the cashier's reach, gaze and sale processing at their respective registers 38.

As shown in FIGS. 4A–4F, the lockable, removable canister 46 comprises a housing 52 including a door 54, a door lock 56, a carrying handle 58, and a canister release knob 60 having a hinged cover 63. The canister 46 receives the bills once they have passed successfully through the bill validator 44. The bills enter the canister 46 through a drop door 62 (FIG. 4F) in the bottom of the housing 52. As the bills are received by the canister 46, they are pushed upward against a bill plate 64 that works against a spring 66. When the canister 46 is full (e.g., 1500 bills), the electronic drop safe 24 is opened by the store manager and the courier service 26, or by the courier service 26, as discussed earlier. The courier service 26 takes the filled canister 46 and delivers it to the processing center 28 where the processing center 28 personnel use a key 67 (which only the processing center 28 retains) to unlock the door lock 56 of the delivered canister 46 and remove the bills. The housing 52 also includes feet 68 that permit the canister 46 to rest on a flat surface (FIGS. 4A, 4C–4E) without damaging or abrasing the drop door 62 during transport/processing of the canister 46.

The two front feet 68 (FIGS. 4C–4E) of the canister 46 cooperate with the bill validator 44 during installation of the canister 46 to the bill validator 44. During installation of an empty canister 46, the operator rotates the canister release knob 60 (FIG. 4B) to the REMOVE setting. This clears an opening (not shown) in the bottom surface of the housing 52, just beyond the drop door 62. This opening allows passage of a catch member 70 (FIG. 3B) at the back of the bill validator 44. When the canister 46 is mated with the bill validator 44 (FIG. 3C), the operator then rotates the canister release knob 60 to the INSTALL setting. This action causes an internal lock mechanism (not shown) in the canister 46 to engage the catch member 70, while at the same time causing the drop door 62 to open (FIG. 4F) in anticipation of bill receipt from the bill validator 44. (Similarly, rotating the canister release knob 60 to the REMOVE setting disengages the internal lock mechanism from the catch member 70, thereby permitting the operator to remove the canister 46.)

Once installed, the operator then rotates the hinged cover 63 downward over the knob 60; the knob 60 comprises an upstanding flange 65 having a hole 67 therein. When the operator rotates the cover 63 downward, the flange 65 passes through a slot (not shown) in the cover 63 only if the knob 60 is properly oriented in the INSTALL position. Hence, the cover 63 and the flange 65 co-operate together to ensure that the knob 60 is properly set in the INSTALL position and thereby prevents any jamming that may occur if the knob 60 were slightly off of the INSTALL setting. Furthermore, for added security, a padlock (not shown) can be secured through the hole 67, thereby locking the cover 63 over the knob 60. The operator can then lift the electronic drop safe door 48 upward and then lock the safe 24. Bills received by the bill validator 44 are fed into the opened drop door 62 via bill feed belts (not shown) in the bill validator 44 that drive the bills into the opening 72 at the drop door 62.

The CMS 20 assigns four canisters 46 per electronic safe 24 to account for: (1) one active canister in the electronic safe 24; (2) one empty canister 46 en route from the processing center 28 via the courier service 26 back to the establishment 22; (3) full canister en route from the establishment 22 to the processing center 28; and (4) one canister being processed at the processing center 28. Such an assignment of canisters 46 ensures that each day a full canister 46 would be removed and taken to the processing center 26 where the bills are counted. In particular, the full canister 46 must be replaced with an empty one so that the establishment can continue to operate; furthermore, the number of days in the cash management cycle that it would take the courier service 26 to process that canister 46 while getting the empty canister 46 returned must also be taken into account. Therefore, if the cash management cycle took four days, the CMS 20 would require four canisters.

It should also be noted that the term "full canister" is defined as a canister 46 that contains whatever store's deposits have been dropped in the corresponding electronic drop safe 24 from the time the canister 46 was installed in that particular electronic drop safe 24 until the time the canister 46 has been picked-up again by the courier service 26; therefore, the term "full canister" does not necessarily imply a canister 46 filled to capacity.

It should be noted that the canister 46 includes a mechanism (not shown) that prevents the accidental re-installation of a full canister 46 once the full canister 46 has been removed. In the process of removing full canisters 46 and replacing them with empty canisters 46, the person doing so may forget which canister 46 is "full" and which is "empty"; therefore, by preventing the re-installation of a "full canister," this mechanism provides the person with an immediate indication of which canisters 46 are "full" and which are "empty".

Figure 5:
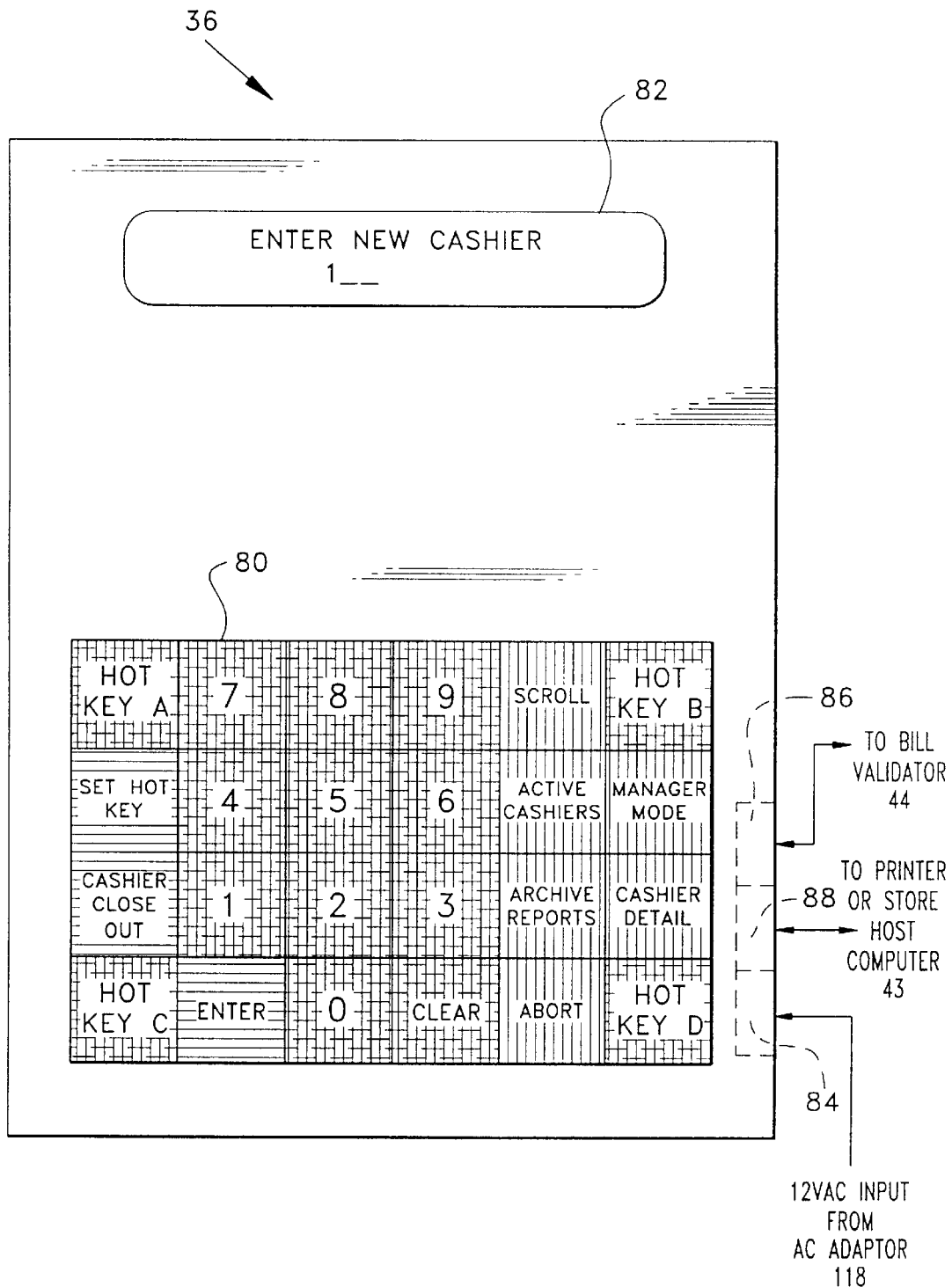
FIG. 5 is a plan view of the controller.

As shown in FIG. 5, the controller 36 comprises a keypad 80 and display 82, an electrical connector 84 (e.g., 2.5 mm DC power jack) for power, an electrical connector 86 (e.g., an RJ45 socket) for the bill validator interface and an electrical connector 88 (e.g., RJ12 socket) for the interface line 42A (to the shared printer 40) or the interface line 42B (to the store host computer 43).

The keypad 80 comprises a 6×4 plastic membrane switch having large keys that beep when they are depressed. The large keys allow the cashier to easily identify the requisite key necessary for a particular operation without having to lower his/her head for any period of time. For example, a drop can be accomplished by depressing a "HOT KEY" (e.g., entering the cashier #), feeding the bill(s) into the bezel 50 and depressing the ENTER key, thereby reducing the amount of time the cashier needs to be looking down at the controller keypad 80.

The keypad 80 also uses three distinct colors for various keys. These colors correspond to the three levels of authorization available in the CMS 20. For example, the yellow keys are available to the cashiers, the shift manager and the store manager. The blue keys are available only to the shift manager and the store manager. The red keys are restricted to use by the store manager only. As will be discussed in detail later, the controller 36 has two modes of operation: Operate Mode and Manager Mode.

The display 82 comprises a 2×20 character Backlit LCD display. Entry of data by the user (i.e., cashier, shift manager or store manager) through the keypad 80 is displayed in the display 82.

Figure 7:
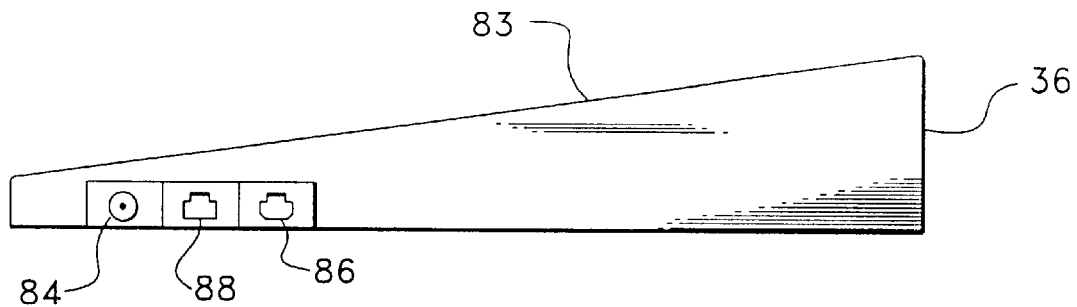
FIG. 7 a side view of the controller.

As shown in FIG. 7, the top surface 83 of the controller 36 (which contains the keypad 80 and display 82) is inclined to facilitate the cashier's viewing and operation of the keypad 80 and display 82 during customer transactions.

Figure 6:
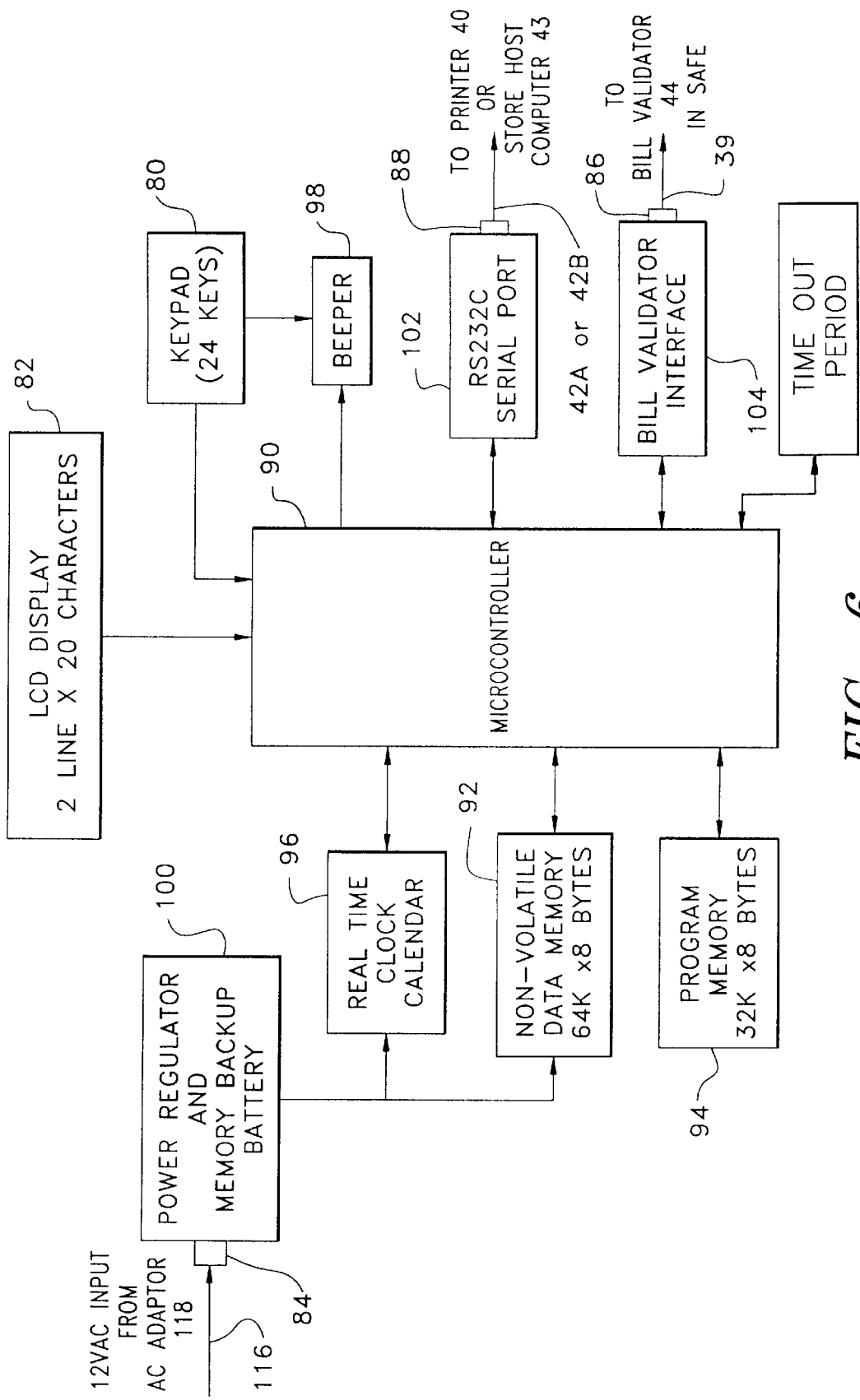
FIG. 6 is a block diagram of the controller.

As shown in FIG. 6, the controller 36 further comprises a microcontroller 90, a non-volatile data storage memory (64K×8) 92, a program memory (32K×8) 94, a real time clock/calendar 96, a beeper 98, a power regulator/memory backup battery 100, an RS232C serial port 102 and a bill validator interface 104 (e.g., an interface that is compatible with the Mars Electronics International SA-7-LRC-L1-D Bill Validator). The microcontroller 90 controls the operation of the CMS 20 in conjunction with the real time clock/calendar 96. As stated earlier, the beeper 98 is activated each time a key is depressed on the keypad 80. The beeper 98 is also activated at all errors or warnings (e.g., when a bill is rejected by the bill validator 44). The battery backup 100 comprises a battery (e.g., Nicad) to retain the date/time and memory for up to 30 days of power loss. Moreover, in the event of a power interruption, the battery backup 100 restores the display 82 to the exact mode (e.g., Manager Mode, as will be discussed later) and setting (e.g., if the user was setting the date at the time of power interruption, the SET DATE option, as will be discussed later, is restored). The internals of the controller 36 are designed for easy, fast access to the internal components for modular replacement.

The synchronization of the store host computer 43 clock (not shown) and the controller clock 96 is necessary for time stamp activity, i.e., the store host computer 43 and the controller 36 must agree on when a drop was entered and the cashier who entered it because when the printout, from the printer 40 or from the store system printer 45, is reviewed there should be total agreement as to when a drop was made, who made the drop and the amount of the drop. This ensures an accurate audit trail. The controller 36 can have the shared printer 40, or the store system printer 45 (via the store host computer 43), report total drops from pickup to pickup and begin-to-end of shift by cashier.

The controller 36 also comprises a "time-out" (1 second minimum, 15 seconds maximum) which is the time that passes between the insertion of one bill and the controller's 36 conclusion that a drop is complete and, as such, the cashier must enter his/her cashier number to initiate another drop. Since this time-out period varies depending on establishment, the controller 36 permits the store manager to vary the time out period. The controller 36 is capable of storing 100 cashier numbers (3 digits).

As shown in FIG. 3A, the controller 36 and AC power are electrically coupled to the electronic drop safe 24 by way of a safe interface panel 108 on side 109A of the safe 24. It should be noted that the safe interface panel 108 can be alternately secured on the other side 109B of the electronic drop safe 24 (FIGS. 3B and 3F) where installation of the safe 24 under the counter (not shown) would obstruct the electrical connections (to be discussed below) to the safe interface panel 108 on a particular side of the safe 24. On the side 109B of the electronic safe 24 that does not contain the safe interface panel 108, a filler panel 111 (FIG. 3B) is releasably secured thereto.

Figure 3D:
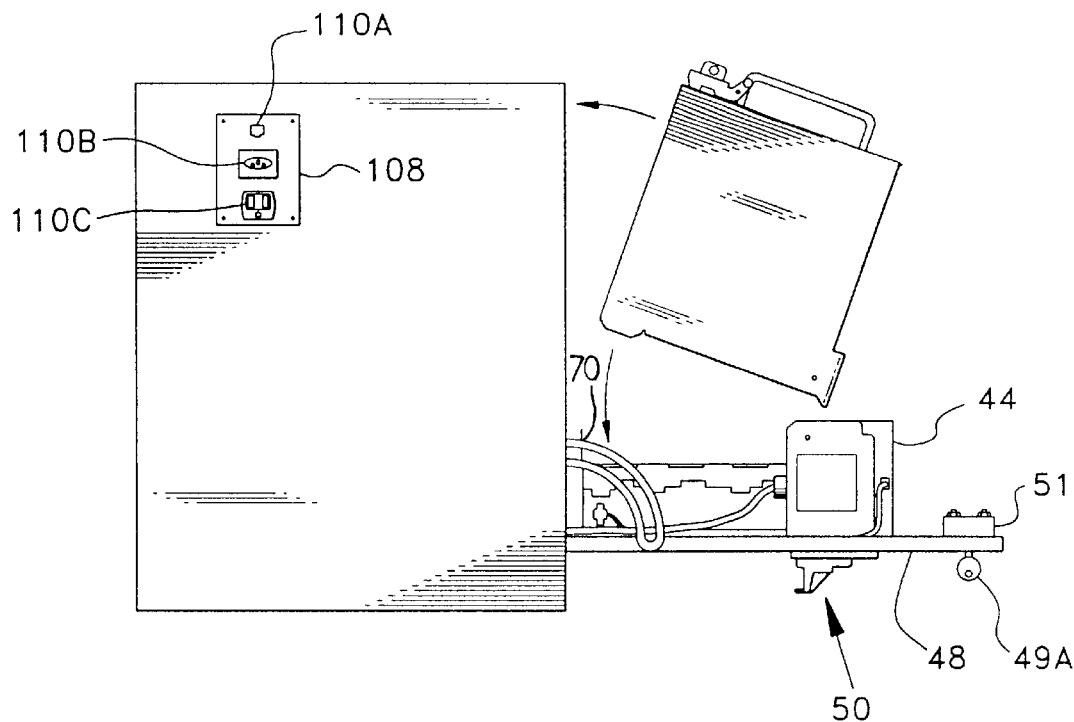
FIG. 3D shows the electronic drop safe in an open condition with the removable, lockable canister being coupled to the bill validator.
Figure 3E:
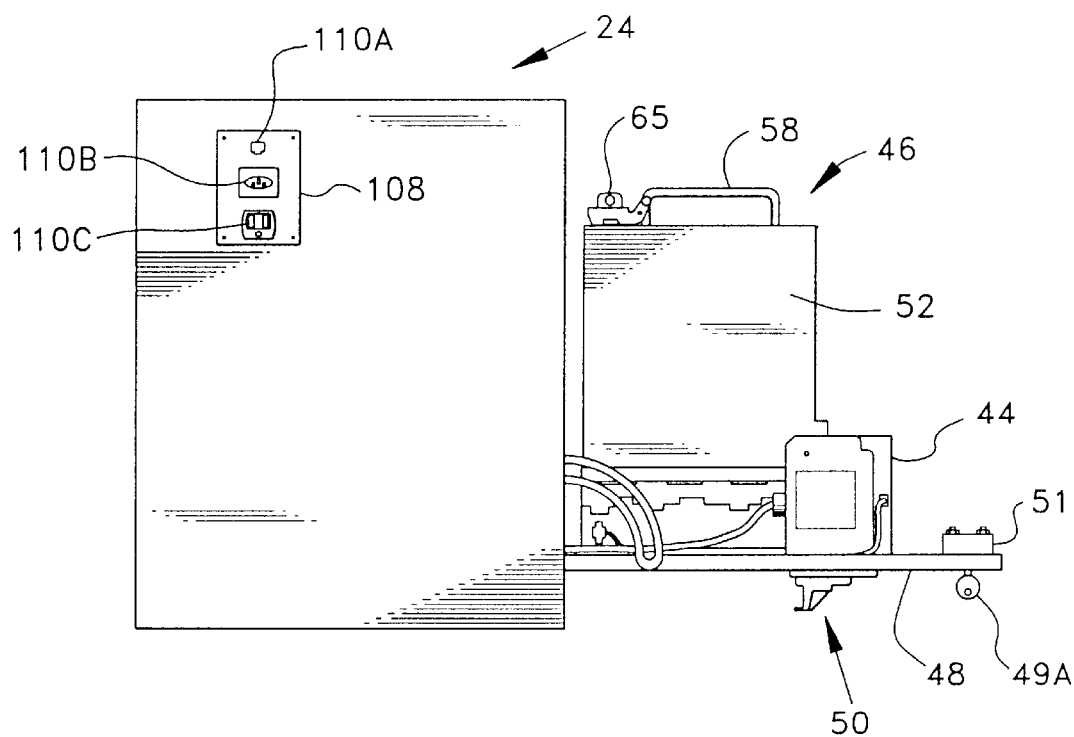
FIG. 3E shows the electronic drop safe in an open condition with the removable, lockable canister coupled to the bill validator.

As shown in FIG. 3D, the bill validator 44 is electronically coupled to the controller 36 via the data interface line 39 (FIGS. 1A–2B) which comprises an external controller harness 106A and an internal controller harness 106B. In particular, the electronic drop safe 24 includes a safe interface panel 108 (FIG. 3A) that receives the coupling from the external controller harness 106A. The external controller harness 106A is coupled at one end to the controller 36 at the electrical connector 86 and to a top jack 110A (e.g., RJ45 socket) on the safe interface panel 108. The internal controller harness 106B is coupled to the top jack 110A at one end and is coupled to the bill validator 44 at the other end. The controller 36 and the bill validator 44 communicate through these harnesses 106A and 106B. All signals are compatible with the SA-7 bill validator 44. Control signals from the controller 36 to the bill validator 44 are supplied through the eighteen pin low level validator/controller interface connector 86.

Power is provided to the bill validator 44 via an external power harness 112A and an internal power harness 112B. In particular, the external power harness 112A is connected to standard wall power (120 VAC) at one end and to a central power receptacle 110B (e.g., IEC 320 AC inlet) on the safe interface panel 108. An internal safe jumper wire 114 is coupled between the central power receptacle 110 and a lower power receptacle 110C (e.g., NEMA 5-15R AC outlet). The internal power harness 112B is internally coupled to the lower power receptacle 110C at one end and to the bill validator 44 at the other end. Therefore, it is through these harnesses 112A and 112B that power is delivered to the bill validator 44. The bill validator 44 is not battery-backed up due to any power failure. To account for any power failure, any commercially-available uninterruptible power supply can be installed.

At this juncture it should also be noted that the controller 36 receives its power also from the safe interface panel 108. In particular, an AC adaptor 118 is connected to the lower power plug 110CB which, as discussed above, receives 120 VAC via the internal jumper wire 114. The AC adaptor 118 converts the 120 VAC power down to 12 VAC for use by the controller 36. The AC adaptor 118 forms one end of a controller power harness 116 while the other end of the controller power harness 116 is coupled to the controller electrical connector 84, discussed previously. This power configuration, i.e., of transforming the 120 VAC down to 12 VAC at the safe interface panel 108 (rather than having an AC adaptor 118 coupled to the controller 36 itself), eliminates any high voltage safety concerns at the controller 36.

It should also be noted at this juncture, that the wire harness configuration of the controller 36/drop safe 24 is modular in design, i.e., the replacement of any cable can be easily accomplished without the need for disassembling the controller 36/drop safe 24; the safe interface panel 108 permits quick disconnection and replacement of the power harnesses (112A/B or jumper 114, harness 116) or data harnesses (106A/B).

The details regarding the operation of bill validators in conjunction with bill canisters are well known in the art (e.g., U.S. Pat. No. 5,209,395 (Zouzoulas et al.)) and will not be described further. Suffice it to say, that once the bill has been validated, it is inserted into the lockable, removable canister 46. It should be noted that the bill validator 44 of the present invention is capable of accepting seven denominations of bills (e.g., $1, $2, $5, $10, $20, $50 and $100 bills) and includes an ergonomically-designed bezel 50 (FIGS. 3F and 8, as will be discussed below) for entering bills inserted by the cashier. The bill validator 44 accepts cash drops from cashiers at no less than 15 bills per minute with minimal rejection.

It should be noted also at this juncture that the data interface 39 can be any suitable communications link that is well-known in the art or a data interface that can be designed by anyone skilled in the art without any undue experimentation; as such, the data interface 39 will not be further discussed.

The bill validator 44 includes a cassette present switch (not shown) which is activated each time the canister 46 is disengaged from the bill validator 44. Activation of this switch is detected by the controller 36 which then issues a print command to the serial port 102 for transmitting a Canister Close-Out report (Appendix) by either the shared printer 40 or by the store system printer 45 via the store host computer 43. The presence of the serial auto switch 53 (FIGS. 1A and 2A; e.g., four input, one output) permits the removal of a plurality of canisters 46 from their respective drop safes 24 without having to wait for the Canister Close-Out report of a particular electronic safe 24 to be completely printed before disengaging another canister 46 from another drop safe 24. As such, where there is only one electronic drop safe 24 in the establishment 22, there is no need for the serial auto switch 53; in that situation, the controller 36 is directly coupled to the printer 40.

Figure 3G:
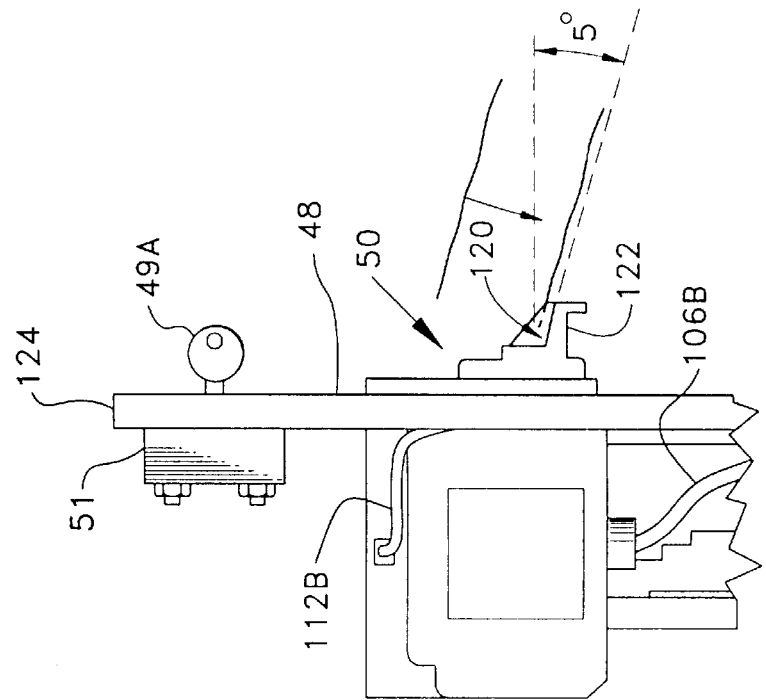
FIG. 3G is an enlarged view of the bezel of the electronic drop safe.
Figure 3F:
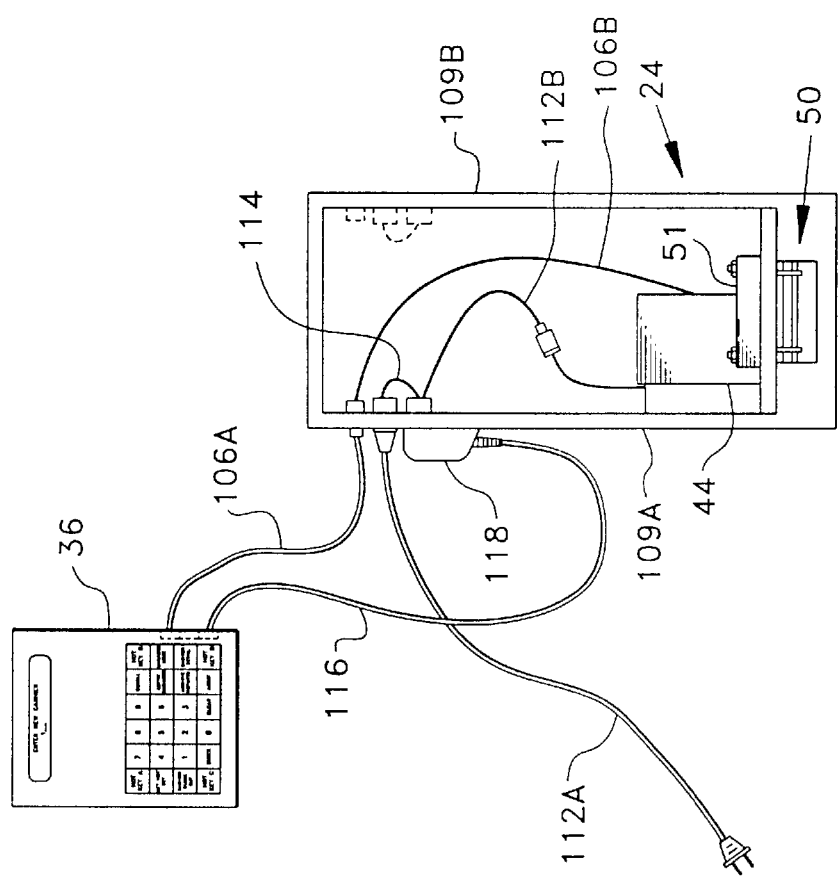
FIG. 3F shows the electrical interface between the controller and the electronic drop safe.
Figure 8:
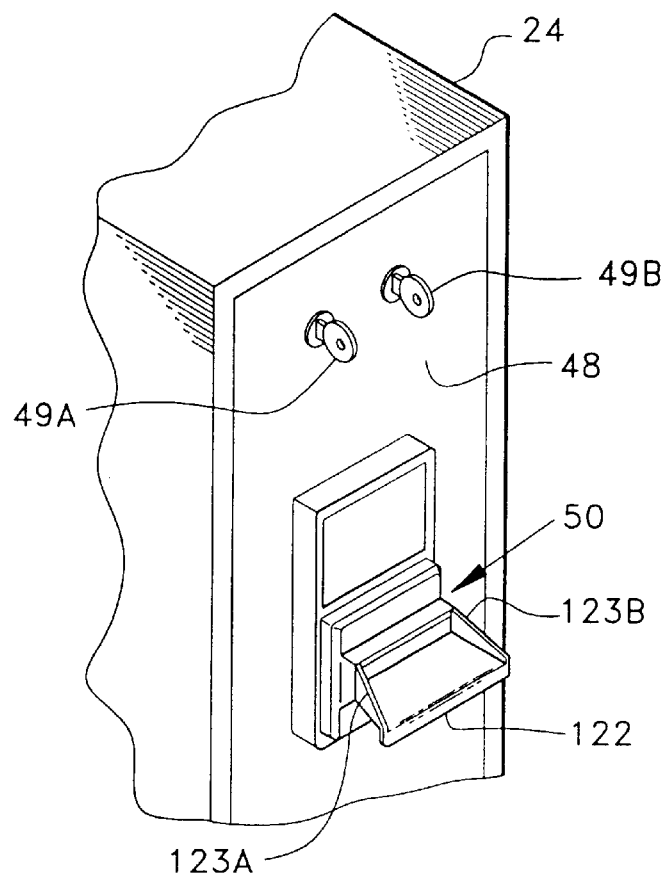
FIG. 8 is an isometric view of the top portion of the safe showing the bezel.

The bezel 50 is the cowling which surrounds the slot opening 120 to the bill validator 44. As shown in FIG. 3G and FIG. 8, a flared protruding lower "lip" (or shelf) 122 and sidewalls 123A and 123B of the bezel 50 help guide the bill as it is brought into the vicinity of the bezel 50 by the cashier during a bill feed, without the need for the cashier to look down. In addition, the bezel 50 is downwardly-directed (angled-down entry of approximately 5°) to prevent the ingress of any spilled liquid on the cashier counter that may drop down towards the bezel 50. It is desirable to have the bezel 50 located as close as possible to the top side 124 (FIG. 3G) of the drop safe door 48 to facilitate the cashier's cash drops without having to bend down too far.

It is within the broadest aspect of this invention that the CMS 20 and CMS 220 can generate a grand total by cashier or an individual total for a given cashier in a single electronic safe 24. The CMS 20 and CMS 220 can support up to 50 cashiers a day. The CMS 20 and CMS 220 can track the number of bills by denomination by cashier. The CMS 20 and CMS 220 are also capable of bar-coding pickup information, including the store #, revenue data, pickup dates, and total contents. This bar code information can facilitate the tracking of the canister 46 as it moves through the cycle of transport and processing. The bar code information is available in the Canister Close-Out Report (Report #4), although such information is not depicted in the attached Report #4.

As stated previously, the controller 36 has two modes of operation: Operate Mode and Manager Mode.

The Operate Mode is the normal mode of the controller 36. The cashier deposits money into the safe 24 when in the Operate Mode. The amount of money deposited by each cashier is monitored as well as the amount of total cash in the electronic drop safe 24. The CMS 20 and CMS 220 do not accept any drop that is not assigned to a specific cashier I.D. #.

The controller display 82 prompts the cashier:

ENTER CASHIER #1 _ _

The cashier enters the second two digits of his/her three-digit identification number (hereinafter "ID"). These ID numbers are assigned to each cashier by the manager. The numbers available for identifying cashiers are between 100 and 199, so that one hundred numbers can be assigned at one time.

The cashier number may also be preset by the Shift Manager or Store Manager at the start of a shift via one of the four "hot keys" labeled A, B, C and D. Use of these keys speeds the bill validation/creditation process by reducing the cashier keystrokes necessary to complete a "drop". When a Hot Key is depressed, the cashier number set for that key is automatically entered and appears on the display. If the cashier enters an invalid number (i.e., one not assigned by the Manager), the following display appears:

xxxINVALID CASHIER#

PLEASE TRY AGAIN

Additionally, the beeper 98 beeps to alert the cashier to the possible mistake.

If the cashier then correctly enters his/her identification number, the process continues normally. If the cashier fails to enter a valid identification number by entering a different invalid number, the same error message will display. If the cashier enters the same invalid number twice in succession, the system enters an Auto Override sub-mode. In the Auto Override sub-mode, the entered identification number is accepted and treated as a correct number for that cashier drop. The number will be maintained without providing the error message until the Close-Out for that cashier is completed or until the canister 46 is removed.

As bills are entered into the bill validator 44, the display 82 shows the value of each bill deposited, as well as the total deposited in this drop, and the cashier I.D. #:

THIS BILL=$10
123 TOTAL=$100

If a bill is rejected, the beeper 98 will sound for 3 seconds. The following prompt is then displayed:

THIS BILL=0
123 TOTAL=$100

The prompt will remain for the full time-out period or until another bill is inserted. It should be noted that it is possible for an unrecognized bill to be stacked if the bill validator 44 cannot physically return the unrecognized bill. In this case, the bill will be identified as an "unknown value" on the Canister Close-Out Report, the Cashier Close-Out Report, and the Cashier Detail Report.

Upon completion of the drop, the cashier depresses the ENTER key. If no activity (bills or key entries) occurs within the set time-out period, the system returns to the starting prompt, ready for another cashier's drop:

ENTER CASHIER #1 _ _

At the end of the cashier's shift, the cashier summons the Shift Manager to complete the Cashier Close-Out. The Cashier Close-Out process automatically deletes the cashier from any Hot Key set with that number.

It should be noted at this juncture that the Shift Manager is permitted to carry out either (1) Set Hot Key or a (2) Cashier Close-Out, as indicated by the blue color of these two keys. In other words, the Shift Manager can modify the Hot Key designations (HOT KEY A, B, C or D) or can carry out a Cashier Close-Out. The Shift Manager cannot activate the following controller mode, i.e., Manager Mode, since this is reserved to the Store Manager, as indicated by the red color of the Manager Mode key.

The Manager Mode comprises the setup functions and reporting functions of the CMS 20 and CMS 220. The Manager Mode is entered by pressing the Manager Mode function key and then entering the Manager's ID at the prompt. The Manager's ID number is a three digit number from 300 to 599. Hence, any number from 300 to 599 can be used as a valid Manager ID number. The default Manager ID set at the factory is 333.

With the display 82 showing the Operate Mode prompt:

ENTER CASHIER #1 _ _ the Store Manager (hereinafter "the Manager") then presses the MANAGER MODE key and is prompted to enter the Manager ID number:

ENTER MANAGER ID
_ _ _

The Manager enters the Manager ID:

ENTER MANAGER ID
333, at which time the Manager Mode is now entered. The display 82 then shows each alternative available and allows the Manager to scroll through the options by depressing the SCROLL key. The options displayed will be scrolled through in this order:

INSTANT CASH AUDIT
ADD CASHIER #
DELETE CASHIER #
SET DROP TIME-OUT
CHANGE MGR ID
CHANGE SHIFT MGR ID
SET DATE
SET TIME
SET STORE NUMBER
HIDE CANISTER TOTAL
SET SAFE NUMBER
PROGRAM VERSION

The Manager depresses the ENTER key when the Option required appears on the display 82. It should be noted that pressing the ABORT key at any menu option in the Manager Mode will return the controller 36 to the Operate Mode.

The Store Manager can perform an INSTANT CASH AUDIT of total cash in the canister 46 (in the electronic drop safe 24) at anytime. When the INSTANT CASH AUDIT option is selected from the Manager menu, the display shows the current cash total contained in the canister 46:

TOTAL=$4567
PRESS A KEY TO CLEAR

When any key is depressed, the display 82 returns to the Manager menu:

INSTANT CASH AUDIT

The Manager may then press the SCROLL key to continue viewing options or press the ABORT key to return to the Operate Mode.

Up to 100 valid cashier numbers can be stored in the controller 36 at one time. When the Manager enters the ADD CASHIER # option, additional cashier numbers can be added. The display 82 prompts the Manager to enter a new cashier number. Since the first digit of a cashier number is always "1", the cursor is at the second digit position awaiting an entry.

ENTER NEW CASHIER #
1 13 _

Upon entering the cashier #, the display 82 returns to the Manager's prompts:

ADD CASHIER #145
ENTER=YES ABORT=NO

Pressing the ENTER key adds the cashier number:

CASHIER #145 ADDED

The controller 36 then returns to the Manager menu:

ADD CASHIER #

The Manager then can press the ENTER key to add another cashier, or press the SCROLL key to continue, or press the ABORT key to return to the Operate Mode.

When the Manager enters the DELETE CASHIER# option, a Cashier# can be deleted. The display prompts the Manager to enter the Cashier# to be deleted. As the first digit is always 1, the cursor will be at the second digit position awaiting an entry:

DELETE CASHIER #
1 _ _

Before completing the deletion, the display 82 prompts the Manager to double check the entry:

DEL 145 ARE YOU SURE?
ENTER=YES ABORT=NO

The display 82 confirms the deletion if the Manager presses the ENTER key:

CASHIER #145
DELETED

The display 82 returns to the Manager's prompt if the Manager presses the ABORT key:

DELETE CASHIER #

To delete another cashier #, the user presses the ENTER key; to continue, the user depresses the SCROLL key; or to return to the Operate Mode, the user presses the ABORT key.

Entering the SET DROP TIME-OUT option allows the Manager to specify the time-out period as 1 to 15 seconds between the last keystroke or bill insertion for a cashier and the automatic reversion to the cashier prompt.

SET DROP TIME-OUT
_ _ SECONDS

The Manager can then enter a 2-digit number between 01 and 15. If an invalid (i.e., other than 1 to 15) entry is made, the prompt shows:

ENTER A NUMBER
BETWEEN 01 AND 15

If a valid entry is made, the prompt confirms the entry:

DROP TIME-OUT SET
08 SECONDS

Pressing the SCROLL key allows the user to continue viewing options or pressing the ABORT key returns the user to the Operate Mode.

Entering CHANGE MGR ID allows the Manager to change the Manager ID number from the factory default, 333. The Manager ID must be a three digit number between 300 and 499. The display 82 prompts the Manager:

ENTER NEW MGR ID
_ _ _

As stated previously, the new Manager ID can be any number between 300 and 499. If an invalid (i.e., other than 300 through 499) entry is made, the prompt shows:

ENTER A NEW NUMBER
BETWEEN 300 AND 499

Before completing the change, the display 82 prompts the Manager to double check the entry:

NEW MGR ID IS XXX
ENTER=YES ABORT=NO

The display 82 then returns to the Main Manager Menu. Pressing the SCROLL key permits the user to continue viewing options or pressing the ABORT key permits the user to return to the Operate Mode.

Entering CHANGE SHIFT MGR ID allows the Manager to change the Shift Manager ID number. The Shift Manager ID authorizes the SET HOT KEY and CASHIER CLOSE-OUT functions only. This allows Shift Managers to readily set Hot Keys for incoming cashiers and close-out outgoing cashiers without having full Manager privileges. Shift Manager ID numbers must be between 200 and 299. The factory set default is 222. The display prompts the Manager:

ENTER NEW S MGR ID

The New Shift Manager ID can be any number between 200 and 299. If an invalid (i.e., other than 200 through 299) entry is made, the prompt shows:

ENTER A NUMBER
BETWEEN 200 AND 299

Before completing the change, the display prompts the Manager to double check the entry:

NEW S MGR ID IS XXX
ENTER=YES ABORT=NO

The display 82 then returns to the Main Manager Menu. The user presses the SCROLL key to continue viewing options or the ABORT key to return to the Operate Mode.

To set or update the date, the Manager enters the SET DATE option. The following prompt then displays:

ENTER THE DATE
XX/XX/XX

The currently set date then displays.

The correct six digit date is then entered. When entries have been made in all six fields, the prompt changes to:

DATE SET 01/06/95
ENTER=YES ABORT=NO

Selecting the ABORT key returns the display 82 to the Main Manager Menu. Selecting the ENTER key confirms the entry:

DATE SET 01/06/95

The display 82 then returns to the Main Manager Menu. Pressing the SCROLL key permits the user to continuing viewing options or pressing the ABORT key permits the user to return to the Operate Mode.

To set or update the time, the Manager enters the SET TIME option. (NOTE: settings are made in military time; all reports show conventional time with "a.m." or "p.m." designation) The following prompt displays:

ENTER MILITARY TIME
HH:MM:SS

When entries have been made in all four fields, the prompt changes to:

TIME SET 09:32:11
ENTER=YES ABORT=NO

Selecting the ABORT key returns the display 82 to the Main Manager Menu. Selecting the ENTER key confirms the entry:

TIME SET 09:32:11

The display 82 then returns to the Main Manager Menu. Pressing the SCROLL key permits the user to continue viewing options or pressing the ABORT key permits the user to return to the Operate Mode.

Selecting the SET STORE NUMBER option allows the Manager to set a 4 digit store number:

ENTER STORE NUMBER
_ _ _ _

When entries have been made in all four fields, the prompt changes to:

STORE #0136 SET
ENTER=YES ABORT=NO

Pressing the ABORT key returns the display 82 to the SET STORE NUMBER prompt. Pressing the ENTER key confirms the entry:

STORE #0136 SET

The display 82 then returns to the SET STORE NUMBER prompt. Pressing the SCROLL key permits the user to continue viewing options while pressing the ABORT key returns the user to the Operate Mode.

Selecting the HIDE CANISTER TOTAL option allows the Manager to define whether or not the canister 46 total shows on the display 82 when the canister 46 is removed:

HIDE CANISTER TOTAL?
ENTER=YES CLEAR=NO

The display 82 confirms the selection:

HIDE CANISTER TOTAL
ENTER=OK CLEAR=RESET
or
SHOW CANISTER TOTAL
ENTER=OK CLEAR=RESET

Selecting the CLEAR key returns the display 82 to the HIDE CANISTER TOTAL? prompt; selecting the ENTER key returns the display 82 to the Main Manager Menu. Selecting the SCROLL key permits the user to continue viewing options while selecting the ABORT key returns the user to the Operate Mode.

Selecting the SET SAFE NUMBER option permits the Manager to identify a unique 2 digit number for each electronic drop safe 24 where there are multiple safes 24 in a store. This unique safe number prints on every report generated by that safe:

ENTER SAFE NUMBER

Two digits are then entered. The display 82 then shows:
SAFE NUMBER XX SET
ENTER=YES ABORT=NO
If the ENTER key is selected, the display 82 shows:
SAFE NUMBER XX SET
The display 82 then returns to the SET SAFE NUMBER prompt. Pressing the SCROLL key permits the user to continue viewing options or pressing the ABORT key permits the user to return to the Operate Mode.

Selecting the PROGRAM VERSION option displays the software version currently installed in the controller 36. This option is only accessed at the direction of a technician when troubleshooting the controller 36:
VX.XX (DATE)
PRESS ANY KEY
The display 82 then returns the user to the PROGRAM VERSION prompt. Pressing the SCROLL key permits the user to continue viewing the options or pressing the ABORT key permits the user to return to the Operate Mode.

When the Manager or Shift Manager presses the SET HOT KEY function key, the display 82 prompts:
ENTER MGR/S MGR ID The Manager enters the Manager ID or the Shift Manager ID
ENTER MGR/S MGR ID
333,
The display 82 prompts the Manager to press one of the four Hot Keys:
PRESS HOT KEY TO SET The display 82 then shows the key selected and prompts the Manager to specify the cashier number:
ON HOT KEY A (B, C or D)
ENTER CASHIER #1 _ _
The display 82 then confirms the selection:
132 ON HOT KEY A
ENTER=OK CLEAR=DELETE
The display 82 then prompts the Manager to continue:
PRESS HOT KEY TO SET Pressing the ABORT key ends this option.

Reports #1, #2 and #3 shown in the Appendix are available to the Manager via specific function keys. In all cases a Manager ID is required to generate the report; a Shift Manager ID is acceptable for a Cashier Close-out report only. Upon pressing the appropriate report key, the display 82 prompts for a Manager ID. Upon entry of a valid Manager ID, the report will print. All reports note any invalid cashier numbers and the safe number designated by the Manager.

If no Manager number is entered, the controller 36 times-out in 5 seconds and returns to the cashier prompt.

If an invalid Manager number, or the Shift Manager ID is entered for a non-authorized report, the display 82 shows INVALID MANAGER ID and reverts to the cashier prompt.

The number of active cashiers is limited to 20. If a 21st cashier attempts to become active (i.e., to make a drop), the controller 36 prompts:
OVER CASHIER LIMIT
To remove this condition, some active cashiers must be closed out.

The number of drops per cashier is limited to 100 per session. If a 101st drop is attempted, the controller 36 prompts:
OVER DROP LIMIT
To remedy this situation, the cashier must be closed out. A new session can then be initiated.

The number of archive Cashier Records is limited to 100 Cashier Close-Outs.

The number of archive Canister Records is limited to 4 Canister Close-Outs.

Each Canister Close-Out Report is achieved through the use of the cassette present switch (not shown) provided on the bill validator 44. As stated earlier, the switch is monitored by the controller 36 and upon detection of the removal of the canister 46, the controller 36 automatically generates the Canister Close-out report.

The controller 36 permits the archiving of the last four events of a Cashier Close-Out, a Cashier's Detail and a Canister Close-Out (see Appendix). In particular, the last four events of the Cashier Close-Out permits the store manager to review the total amount of cash dropped by a cashier per shift for the last four shifts of that cashier. The last four events of the Cashier's Detail permits the store manager to review every drop made by a cashier by a time stamp over the last four cashier close outs. The last four events of the Canister Close-Outs allows the store manager to review the last four canister close outs for a particular safe.

Without further elaboration, the foregoing will so fully illustrate the invention that others may, by applying current or future knowledge, adopt the same for use under various conditions or service.

---

Appendix

---

Report #1: Cashier Close-Out

Access:
• Press CASHIER CLOSE-OUT
• Enter Manager ID or Shift Manager ID
• Enter Cashier ID To Print
• Report prints
NOTE: Printing this report deletes this cashier # from any Hot Key
CASHIER CLOSE-OUT
(Present Date and Time)
INVALID CASHIER (or) VALID CASHIER
Cashier#103
Date and Start Time:
01/03/95   5:35 p.m.
Date and End Time:
01/03/95   11:35 p.m.
Total Drops:
$1,425.00
# of Unknown Value Notes:0
(Archive holds the past 4 Close-Outs; Selection of "archive" option automatically prints all 4 Close-Outs on the same report, the most recent appearing first)

Report #2: Active Cashiers

• Access:
• Press ACTIVE CASHIERS key
• Enter Manager ID
• Report prints:

Appendix

ACTIVE CASHIERS
(Present Date and Time)
INVALID ACTIVE CASHIERS
(NOTE: Prints information or the word "none")
Cashier#163
Date and Start Time:
01/03/95   1:54 a.m.
Total Drops:
$25.00
# of Unknown Value Notes:0
VALID ACTIVE CASHIERS
Cashier #103
Date and Start Time:
01/03/95   5:35 p.m.
Total Drops:
$1,425.00
# of Unknown Value Notes:0
Cashier#123
Date and Start Time:
01/03/95   11:35 p.m.
Total Drops:
$425.00
# of Unknown Value Notes:0
Cashier#163
Date and Start Time:
01/03/95   1:35 a.m.
Total Drops:
$425.00
# of Unknown Value Notes:0

Report #3 Cashier Detail (This report shows the current shift in progress or the last closed out shift if cashier# is currently not active)
- Access:
- Press CASHIER DETAIL key
- Enter Manager ID
- Enter Cashier ID To Print
- Report prints Cashier Detail
(Present Date and Time)
Cashier#163
Date and Start Time:
01/03/95   5:35 p.m.
Date and End Time:
01/03/95   9:15 p.m.
5:40 p.m.   $20
5:43 p.m.   $100
5:53 p.m.   $10
6:03 p.m.   $40
6:08 p.m.   Unknown Value
Total $170.00
# of Unknown Value Notes:2

(Archive holds detail from the past 4 Close-Outs; Selection of "archive" option automatically prints detail from all 4 Close-outs on the same report, the most recent appearing first.)

Report# 4: Canister Close-Out

- Remove Canister from safe and Report automatically prints
- The Canister Total automatically appears on the display while the report is printing TOTAL = xxxxx
PRESS A KEY TO CLEAR Note: Canister Total will not appear if HIDE CANISTER TOTAL option has been set or when printing a Canister Total from archive.

CANISTER CLOSE-OUT
(Present Date and Time)
Revenue Date: 01/03/95
Begin Date and Time:
01/03/95   09:00 a.m.
End Date and Time:
01/04/95   09:17 a.m.
Contribution By Cashier:
Closed Out:
102   $ 453.00
107   $1980.00
114   $ 674.00
139   $ 163.00

Active:
103   $453.00
106   $200.00
Canister Total: $3,923.00
Cash in Canister
$100:   $ 100.00
$50:    $ 100.00
$20:    $1500.00
$10:    $2100.00
$5:     $ 75.00
$2:     0
$1:     $ 48.00
Unknown Value   1

• If printer is out of paper or off line, the following prompt will appear

PRINTER IS OFFLINE
CLR=RETRY ABORT=EXIT

This report forces Close-Out of all active cashiers automatically. It does not clear the Cashier number from any Hot Key currently set. It does not generate an individual Cashier Close-Out report. If needed, Active Cashier totals can be obtained from the Canister Close-Out report which automatically prints. Active cashiers can continue to make drops into the new canister and accumulate a new drop total. Hot keys will automatically be cleared only when an individual Cashier Close-Out process is completed.

The Canister Close-Out Function coordinates the collection of the canister with an automatic reset of canister totals. This is achieved through the use of the "cassette present" switch provided on the SA-7 LRC. This switch is monitored by the controller 36 and upon detection of the removal of the canister, automatically generates the CANISTER CLOSE-OUT report.

Archive Reports

Archive Reports hold information totals from the past 4 events for Cashier Close-Outs, Cashier Detail or Canister Close-Outs; Selection of the "archive" option automatically prints detail from all 4 events on the same report, the most recent appearing first. All reports note any invalid Cashier numbers.

Archive reports are available to the Manager via the ARCHIVE REPORTS function key. Upon pressing the key, the display prompts for a Manager ID.

If no Manager number is entered, the controller 36 times-out in 5 seconds and return to the Cashier prompt.

If an invalid Manager number is entered the display 82 shows INVALID MANAGER ID and reverted to the Cashier prompt.

Upon entry of a valid Manager ID, the following options appear in sequence on the display 82:

CASHIER CLOSE-OUT
ENTER=OK SCROLL=NEXT (if chosen the display 82 prompts for a Cashier# before printing)

CASHIER DETAIL
ENTER=OK SCROLL=NEXT (if chosen the display 82 prompts for a Cashier# before printing)

CANISTER CLOSE-OUT
ENTER=OK SCROLL=NEXT

---

We claim:

1. An electronic drop safe sufficiently small to be securely mounted under a cashier counter below a cash register, the electronic drop safe comprising:

a drop safe for securing bills received during a transaction;

a bill validator coupled to the drop safe for determining the denomination of the bills secured in the drop safe;

a controller adjacent the cash register electronically coupled to the bill validator for tracking information relevant to bills secured in the drop safe.

2. The cash management system according to claim 1 wherein the controller is physically separate from the drop safe.

3. The cash management system according to claim 1 wherein the controller is capable of being electronically coupled to a cash register.

4. The cash management system according to claim 1 wherein the electronic drop safe comprises a first side and a second side opposite the first side, and an interface panel for coupling the bill validator to the controller, the interface panel being mounted on one of the first side and the second side of the drop safe.

5. The cash management system according to claim 1 wherein the drop safe comprises a removable canister for securing bills within the drop safe.

6. The cash management system according to claim 5 wherein the drop safe comprises a first locking door and the removable canister comprises a second locking door.

7. The cash management system according to claim 1 further comprising a printer coupled to the controller for generating a printout of relevant information pertaining to the cash management system.

8. The cash management system according to claim 7 wherein the printout contains information regarding the bills secured in the electronic drop safe.

9. The cash management system according to claim 1 wherein the electronic drop safe comprises a substantially horizontal slot for receiving bills to be secured in the drop safe.

10. The cash management system according to claim 9 wherein the slot is located in an upper section of the electronic drop safe.

11. The cash management system according to claim 9 wherein the electronic drop safe further comprises a bezel adjacent the slot designed to provide a cashier with a tactile feel to facilitate securing the bills in the electronic drop safe.

12. The cash management system according to claim 11 wherein the bezel is oriented downward at an angle from a horizontal plane.

13. The cash management system according to claim 1 wherein the controller comprises a keypad having a plurality of keys for entering data into the controller.

14. The cash management system according to claim 13 wherein the plurality of keys comprises a plurality of different colored keys.

15. The cash management system according to claim 13 wherein the controller further comprises a display.

16. The cash management system according to claim 13 wherein the business establishment includes a plurality of cashiers, each with a respective individual identification code, wherein the cashiers receive bills during sales transactions and secure such bills within the drop safe, and wherein the information tracked by the controller comprises, for each sales transaction, the amount of the bills from the transaction secured in the drop safe, the time at which the sales transaction occurs, and the identification code of the cashier securing bills in the drop safe following the transaction.

17. The cash management system according to claim 16 wherein each cashier identification code comprises a plurality of characters, and wherein the keypad comprises at least one key that allows for single keystroke entry of the identification codes.

18. The cash management system according to claim 16 wherein the controller further comprises an operate mode during which the cashiers enter their respective identification code.

19. The cash management system according to claim 18 wherein the controller further comprises a time-out period during which the display indicates the denomination of each bill as it is being secured in the electronic drop safe by a cashier, and the aggregate amount of the bills secured and wherein the controller requires reentry of an identification code of a cashier following the time-out period before additional bills can be secured in the electronic drop safe.

20. The cash management system according to claim 19 wherein the time-out period comprises an adjustable period between about 1 second and about 15 seconds.

21. The cash management system according to claim 16 wherein the business establishment further includes a manager, and wherein the controller further comprises a manager mode during which data entry into the controller is restricted to only the manager.

22. The cash management system according to claim 21 wherein the drop safe comprises a removable canister for securing bills within the drop safe and wherein the manager mode comprises means for commanding the printer to generate a printout automatically upon removal of the canister from the drop safe.

23. The cash management system according to claim 21 wherein the controller further comprises a means for storing and retrieving data corresponding to a plurality of previous sales transactions wherein bills were secured in the drop safe.

24. The cash management system according to claim 16 further comprising a printer coupled to the controller for generating a printout of relevant information pertaining to the cash management system and wherein the printout contains information regarding the bills secured in the electronic drop safe, and wherein the information contained in the printout is organized by cashier code.

25. The cash management system according to claim 24 wherein the information contained in the printout includes the amount of each transaction, by each cashier according to respective identification codes.

26. The cash management system according to claim 25 wherein the information contained in the printout further includes the time of each transaction, by each cashier according to respective identification codes.

27. The cash management system according to claim 26 wherein the information contained in the printout further includes a shift of each transaction, by each cashier according to respective identification codes.

28. The cash management system according to claim 27 wherein the information contained in the printout further includes a day of each transaction, by each cashier according to respective identification codes.

29. The cash management system according to claim 28 wherein the information contained in the printout further includes a total balance of all the bills secured in the drop safe.

30. A cashier station comprising:
a cashier counter;
a cash register positioned on the cashier counter;
an electronic drop safe positioned adjacent the cash register, the electronic drop safe comprising a safe for securing bills received during a transaction and a bill validator coupled to the safe for determining the denomination of the bills secured in the safe; and
a controller electronically coupled to the bill validator electronic drop safe for tracking information relevant to bills secured in the electronic drop safe, the controller including a keypad adjacent the cash register, the keypad having a plurality of keys for entering data into the controller.

31. The cashier station according to claim 30 wherein the controller is physically separate from the electronic drop safe.

32. The cashier station according to claim 30 wherein the controller is capable of being electronically coupled to the cash register.

33. The cashier station according to claim 30 wherein the keypad is positioned on the cashier counter and the electronic drop safe is positioned under the cashier counter.

34. The cashier station according to claim 30 wherein the drop safe comprises a removable canister for securing bills within the drop safe.

35. The cashier station according to claim 34 wherein the drop safe comprises a first locking door and the removable canister comprises a second locking door.

36. The cashier station according to claim 30 wherein the electronic drop safe comprises a substantially horizontal slot for receiving bills to be secured in the drop safe.

37. The cashier station according to claim 36 wherein the slot is located in an upper section of the electronic drop safe.

38. The cashier station according to claim 36 wherein the electronic drop safe further comprises a bezel adjacent the slot designed to provide a cashier with a tactile feel to facilitate securing bills in the electronic drop safe.

39. The cashier station according to claim 30 wherein the business establishment includes a plurality of cashiers, each with a respective individual identification code, wherein the cashiers receive bills during sales transactions and secure such bills within the drop safer, and wherein the information tracked by the controller comprises, for each sales transaction, the amount of the bills from the transaction secured in the drop safe, the time at which the sales transaction occurs, and the identification code of the cashier securing bills in the drop safe following the transaction.

40. The cashier station according to claim 39 wherein each cashier identification code comprises a plurality of characters, and wherein the keypad comprises at least one key that allows for single keystroke entry of the identification codes.

41. The cashier station according to claim 39 further comprising a printer coupled to the controller for generating a printout of relevant information pertaining to the cash management system.

42. The cashier station according to claim 41 wherein the controller further comprises a means for storing and retrieving data corresponding to a plurality of previous sales transactions wherein bills were secured in the drop safe.

43. A cash management system comprising:
   a plurality of cashier's stations, each cashier station comprising:
   a cashier counter;
   at least one cash register positioned on the cashier counter;
   an electronic drop safe located adjacent the cash register, the electronic drop safe comprising a drop safe for securing bills received during a transaction and a bill validator coupled to the drop safe for determining the denomination of the bills secured in the drop safe; and
   a controller positioned adjacent the cash register and electronically coupled to the electronic drop safe.

44. The cash management system according to claim 43 wherein the controller is physically separate from the electronic drop safe.

45. The cash management system according to claim 43 wherein the controller is capable of being electronically coupled to the at least one cash register.

46. The cash management system according to claim 43 wherein the drop safe comprises a removable canister for securing bills within the drop safe.

47. The cash management system according to claim 43 further comprising a printer coupled to the controller for generating a printout of relevant information pertaining to the cash management system.

48. The cash management system according to claim 43 wherein the electronic drop safe comprises a substantially horizontal slot for receiving bills to be secured in the drop safe.

49. The cash management system according to claim 48 wherein the slot is located in an upper section of the electronic drop safe.

50. The cash management system according to claim 49 wherein the electronic drop safe further comprises a bezel adjacent the slot designed to provide a cashier with a tactile feel to facilitate securing bills in the electronic drop safe.

51. The cash management system according to claim 43 wherein the controller comprises a keypad having a plurality of keys for entering data into the controller.

52. The cash management system according to claim 51 wherein the business establishment includes a plurality of cashiers, each with a respective individual identification code, wherein the cashiers receive bills during sales transactions and secure such bills within the drop safe, and wherein the information tracked by the controller comprises, for each sales transaction, the amount of the bills from the transaction secured in the drop safe, the time at which the sales transaction occurs, and the identification code of the cashier securing bills in the drop safe following the transaction.

53. The cash management system according to claim 52 wherein each cashier identification code comprises a plurality of characters, and wherein the keypad comprises at least one key that allows for single keystroke entry of the identification codes.

54. A cash management system for use in securing and tracking bills received during a transaction at a business establishment having at least one cash register on a cashier counter, the cash management system comprising;
   an electronic drop safe located at the cashier counter for immediately securing bills received during the transaction;
   a bill validator coupled to the drop safe for determining the denomination of the bills secured in the drop safe; and
   a controller located adjacent the cash register, said controller being electronically coupled to the bill validator for tracking information relevant to the bills secured in the drop safe.

55. The cash management system according to claim 54 wherein the controller is physically separate from the electronic drop safe.

56. The cash management system according to claim 54 wherein the controller is capable of being electronically coupled to a cash register.

57. The cash management system according to claim 54 wherein the drop safe comprises a removable canister for securing bills within the drop safe.

58. The cash management system according to claim 54 further comprising a printer coupled to the controller for generating a printout of relevant information pertaining to the cash management system.

59. The cash management system according to claim 54 wherein the electronic drop safe comprises a substantially horizontal slot for receiving bills to be secured in the drop safe.

60. The cash management system according to claim 59 wherein the slot is located in an upper section of the electronic drop safe.

61. The cash management system according to claim 54 wherein the controller comprises a keypad having a plurality of keys for entering data into the controller.

62. The cash management system according to claim 61 wherein the business establishment includes a plurality of cashiers, each with a respective individual identification code, wherein the cashiers receive bills during sales transactions and secure such bills within the drop safe, and wherein the information tracked by the controller comprises, for each sales transaction, the amount of the bills from the transaction secured in the drop safe, the time at which the sales transaction occurs, and the identification code of the cashier securing bills in the drop safe following the transaction.

63. The cash management system according to claim 62 wherein each cashier identification code comprises a plurality of characters, and wherein the keypad comprises at least one key that allows for single keystroke entry of the identification codes.

64. A cash management system for use in securing and tracking bills received during a transaction at a business establishment having at least one cashier station comprising a cashier counter and an electronic cash register on the cashier counter, the cash management system comprising:
  a store host computer electronically coupled to the electronic cash register;
  an electronic drop safe adjacent the cashier counter for immediately securing bills received during the transaction;
  a bill validator coupled to the drop safe for determining the denomination of the bills secured in the drop safe; and
  a controller electrically connected to the bill validator, wherein the controller is electronically coupled with the store host computer.

65. The cash management system according to claim 64 wherein the electronic drop safe comprises a substantially horizontal slot for receiving bills to be secured in the drop safe.

66. The cash management system according to claim 64 wherein the controller is physically separate from the electronic drop safe.

67. The cash management system according to claim 64 wherein the drop safe comprises a removable canister for securing bills within the drop safe.

68. The cash management system according to claim 64 further comprising at least one additional electronic drop safe having a bill validator for determining the denomination of the bills secured in the additional drop safe, the store host computer also electronically coupled to the bill validator of the additional electronic drop safe.

69. The cash management system according to claim 64 further comprising a printer coupled to the controller for generating a printout of relevant information pertaining to the cash management system.

70. The cash management system according to claim 64 wherein the controller comprises a keypad having a plurality of keys for entering data into the controller.

71. The cash management system according to claim 70 wherein the business establishment includes a plurality of cashiers, each with a respective individual identification code, wherein the cashiers receive bills during sales transactions and secure such bills within the drop safe, and wherein the information tracked by the controller comprises, for each sales transaction, the amount of the bills from the transaction secured in the drop safe, the time at which the sales transaction occurs, and the identification code of the cashier securing bills in the drop safe following the transaction.

72. The cash management system according to claim 71 wherein each cashier identification code comprises a plurality of characters, and wherein the keypad comprises at least one key that allows for single keystroke entry of the identification codes.

73. A cash management system for use in securing and tracking bills received during a transaction at a business establishment having at least one cash register at a cashier counter, the cash management system comprising;
  means for immediately securing at least some of the bills received during the transaction, the securing means located at the cashier counter;
  means for validating the bills secured, the validating means coupled to the securing means and located substantially proximate one of the at least one cash registers; and
  means for tracking information relevant to the secured bills, the tracking means located substantially adjacent to one of the at least one cash registers and electronically coupled to the tracking means.

74. A method for cash management at a business establishment having a plurality of cashiers and at least one cash register at a cashier station, the method comprising the steps of:
  providing an electronic drop safe having a bill validator at the cashier station, the drop safe positioned within the cashier station so that the bill validator is substantially proximate one of the at least one cash registers;
  providing a controller electronically coupled to the bill validator and substantially adjacent the one of the at least one cash registers;
  securing a series of bills received during a transaction into the drop safe through the bill validator upon receipt from a customer;
  automatically determining a denomination of each of the bills secured in the drop safe, a time of the transaction, and a total amount secured in the drop safe during the transaction; and
  storing the data determined in the previous step for each transaction.

75. The method according to claim 74 further comprising the step of associating a respective cashier identification code with a transaction drop.

76. The method according to claim 75 further comprising the step of generating a printout of the data stored for transaction.

77. The method according to claim 76 wherein the step of securing the bills into the drop safe comprises securing the bills into a removable canister located within the drop safe and coupled to the bill validator.

78. The method according to claim 77 further comprising the step of removing the canister and transporting the canister along with the printout to a processing center where the bills are sorted and counted in a secure environment.

79. An electronic drop safe sufficiently small to be securely mounted under a cashier counter below a cash register, the electronic drop safe comprising:
  a drop safe for securing bills received during a transaction;
  a bill validator coupled to the drop safe for determining the denomination of the bills secured in the drop safe;
  a controller positionable adjacent a cash register electronically coupled to the bill validator for tracking information relevant to bills secured in the drop safe;

wherein the controller is capable of being electronically coupled to a cash register.

80. An electronic drop safe sufficiently small to be securely mounted under a cashier counter below a cash register, the electronic drop safe comprising:

a drop safe for securing bills received during a transaction;

a bill validator coupled to the drop safe for determining the denomination of the bills secured in the drop safe;

a controller positionable adjacent a cash register electronically coupled to the bill validator for tracking information relevant to bills secured in the drop safe;

wherein the drop safe comprises a removable canister for securing bills within the drop safe;

wherein the drop safe comprises a first locking door and the removable canister comprises a second locking door.

81. An electronic drop safe sufficiently small to be securely mounted under a cashier counter below a cash register, the electronic drop safe comprising:

a drop safe for securing bills received during a transaction;

a bill validator coupled to the drop safe for determining the denomination of the bills secured in the drop safe;

a controller positionable adjacent a cash register electronically coupled to the bill validator for tracking information relevant to bills secured in the drop safe;

wherein the electronic drop safe comprises a substantially horizontal slot for receiving bills to be secured in the drop safe;

wherein the electronic drop safe further comprises a bezel adjacent the slot designed to provide a cashier with a tactile feel to facilitate securing the bills in the electronic drop safe.

82. An electronic drop safe sufficiently small to be securely mounted under a cashier counter below a cash register, the electronic drop safe comprising:

a drop safe for securing bills received during a transaction;

a bill validator coupled to the drop safe for determining the denomination of the bills secured in the drop safe;

a controller positionable adjacent a cash register electronically coupled to the bill validator for tracking information relevant to bills secured in the drop safe;

wherein the controller comprises a keypad having a plurality of keys for entering data into the controller;

wherein the business establishment includes a plurality of cashiers, each with a respective individual identification code, wherein the cashiers receive bills during sales transactions and secure such bills within the drop safe, and wherein the information tracked by the controller comprises, for each sales transaction, the amount of the bills from the transaction secured in the drop safe, the time at which the sales transaction occurs, and the identification code of the cashier securing bills in the drop safe following the transaction;

wherein each cashier identification code comprises a plurality of characters, and wherein the keypad comprises at least one key that allows for single keystroke entry of the identification codes.

83. An electronic drop safe sufficiently small to be securely mounted under a cashier counter below a cash register, the electronic drop safe comprising:

a drop safe for securing bills received during a transaction;

a bill validator coupled to the drop safe for determining the denomination of the bills secured in the drop safe;

a controller positionable adjacent a cash register electronically coupled to the bill validator for tracking information relevant to bills secured in the drop safe;

wherein the controller comprises a keypad having a plurality of keys for entering data into the controller;

wherein the business establishment includes a plurality of cashiers, each with a respective individual identification code, wherein the cashiers receive bills during sales transactions and secure such bills within the drop safe, and wherein the information tracked by the controller comprises, for each sales transaction, the amount of the bills from the transaction secured in the drop safe, the time at which the sales transaction occurs, and the identification code of the cashier securing bills in the drop safe following the transaction;

wherein the controller further comprises an operate mode during which the cashiers enter their respective identification code;

wherein the controller further comprises a time-out period during which the display indicates the denomination of each bill as it is being secured in the electronic drop safe by a cashier, and the aggregate amount of the bills secured and wherein the controller requires reentry of an identification code of a cashier following the time-out period before additional bills can be secured in the electronic drop safe.

84. An electronic drop safe sufficiently small to be securely mounted under a cashier counter below a cash register, the electronic drop safe comprising:

a drop safe for securing bills received during a transaction;

a bill validator coupled to the drop safe for determining the denomination of the bills secured in the drop safe;

a controller positionable adjacent a cash register electronically coupled to the bill validator for tracking information relevant to bills secured in the drop safe;

a printer coupled to the controller for generating a printout of relevant information pertaining to the cash management system;

a removable canister for securing bills within the drop safe;

means for commanding the printer to generate a printout automatically upon removal of the canister from the drop safe.

\* \* \* \* \*